(12) United States Patent
Sawatari et al.

(10) Patent No.: US 8,139,189 B2
(45) Date of Patent: Mar. 20, 2012

(54) LIQUID CRYSTAL DISPLAY HAVING PARTICULAR OBLIQUE VAPOR DEPOSITION-ALIGNMENT LAYER WITH FERROELECTRIC LIQUID CRYSTAL

(75) Inventors: Naoko Sawatari, Tokyo-to (JP); Masato Okabe, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 371 days.

(21) Appl. No.: 12/517,591

(22) PCT Filed: Dec. 19, 2007

(86) PCT No.: PCT/JP2007/074465
§ 371 (c)(1),
(2), (4) Date: Jun. 4, 2009

(87) PCT Pub. No.: WO2008/075732
PCT Pub. Date: Jun. 26, 2008

(65) Prior Publication Data
US 2010/0007832 A1   Jan. 14, 2010

(30) Foreign Application Priority Data
Dec. 20, 2006   (JP) ................................ 2006-343614

(51) Int. Cl.
*G02F 1/1337* (2006.01)
*G02F 1/141* (2006.01)
(52) U.S. Cl. ......... 349/125; 349/127; 349/133; 349/134
(58) Field of Classification Search .................. 349/125, 349/127, 133, 134
See application file for complete search history.

(56) References Cited

U.S. PATENT DOCUMENTS

| 4,783,148 A | | 11/1988 | Tsuboyama et al. | |
|---|---|---|---|---|
| 5,009,489 A | * | 4/1991 | Eguchi et al. | 349/126 |
| 5,099,344 A | * | 3/1992 | Tsuboyama et al. | 349/138 |
| 5,101,289 A | * | 3/1992 | Takao et al. | 349/106 |
| 5,109,293 A | * | 4/1992 | Matsunaga et al. | 349/189 |

(Continued)

FOREIGN PATENT DOCUMENTS

JP   62-182719 A   8/1987

(Continued)

OTHER PUBLICATIONS

Toshiaki Nonaka, et al; "Material characteristics of an active matrix LCD based upon chiral smectics", Liquid Crystals, 1999, vol. 26, No. 11, pp. 1599-1602.

(Continued)

*Primary Examiner* — Mike Qi
(74) *Attorney, Agent, or Firm* — Ladas & Parry LLP

(57) ABSTRACT

A main object of the present invention is to provide a liquid crystal display, using a ferroelectric liquid crystal exhibiting mono-stability, which makes it possible to control the direction of the spontaneous polarization of the ferroelectric liquid crystal. The liquid crystal display is produced by holding a ferroelectric liquid crystal between: an oblique vapor deposition-alignment layer of a first alignment treatment substrate, in which a first electrode layer and the oblique vapor deposition-alignment layer are formed in this order on a first substrate; and a fixed liquid crystal layer of a second alignment treatment substrate, in which a second electrode layer, an alignment layer for reactive liquid crystal and the fixed liquid crystal layer are laminated in this order on the second substrate.

10 Claims, 9 Drawing Sheets

U.S. PATENT DOCUMENTS

| | | | |
|---|---|---|---|
| 5,617,229 A * | 4/1997 | Yamamoto et al. | 349/42 |
| 5,748,274 A * | 5/1998 | Taniguchi et al. | 349/133 |
| 7,326,449 B2 | 2/2008 | Geisow et al. | |
| 2002/0085153 A1 | 7/2002 | Choi et al. | |

FOREIGN PATENT DOCUMENTS

| | | |
|---|---|---|
| JP | 62-275223 A | 11/1987 |
| JP | 63-077019 A | 4/1988 |
| JP | 01-105912 A | 4/1989 |
| JP | 7-64051 A | 3/1995 |
| JP | 7-239485 A | 9/1995 |
| JP | 2000-010076 A | 1/2000 |
| JP | 2003-098529 A | 4/2003 |
| JP | 2004-078099 A | 3/2004 |
| JP | 2004-109787 A | 4/2004 |
| JP | 2005-208353 A | 8/2005 |
| JP | 2005-234549 A | 9/2005 |
| JP | 2005-234550 A | 9/2005 |
| JP | 2005-258428 A | 9/2005 |
| JP | 2006-323223 A | 11/2006 |

OTHER PUBLICATIONS

J.S. Patel, et al; "Alignment of liquid crystals which exhibit cholesteric to smectic $C$ phase transitions", J. Appl. Phys. 59(7), Apr. 1, 1986, pp. 2355-2360.

International Search Report; PCT/JP2007/074465.

Yuji Murakami, et al; "Intrinsic Half-V-Mode Ferroelectric Liquid Crystal Displays Fabricated Using Hybrid Alignment Exhibiting High Contrast Ratio and High Reliability without DC Voltage Application to Remove Layer Degeneracy and Their Electro-Optic Characteristics", Jpn. J. Appl. Phys., vol. 42, pp. 2759-2761; May 2003 (exact date not given).

* cited by examiner

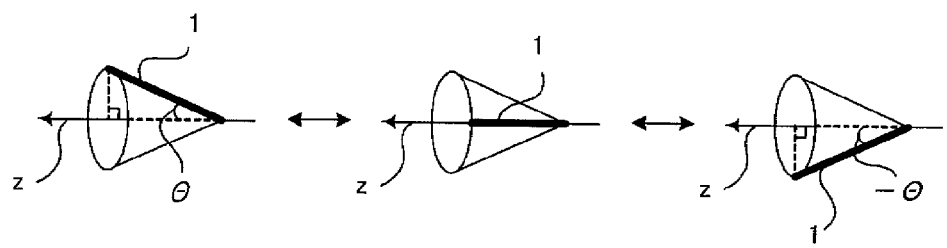
FIG. 1A     FIG. 1B     FIG. 1C
FIG. 2
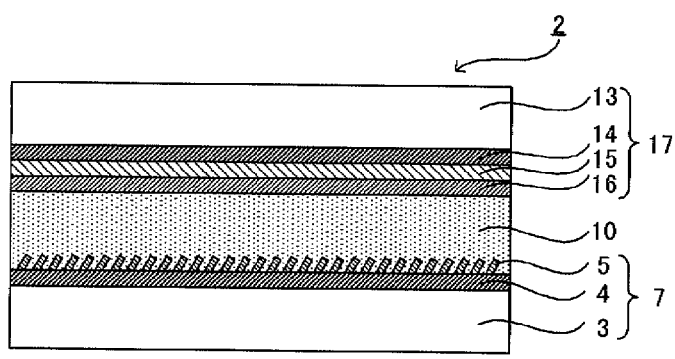
FIG. 3
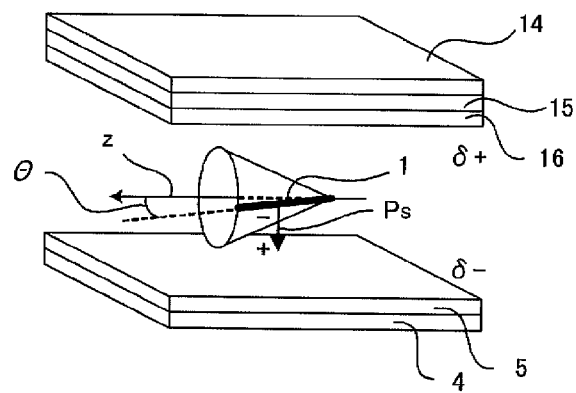

FIG. 11
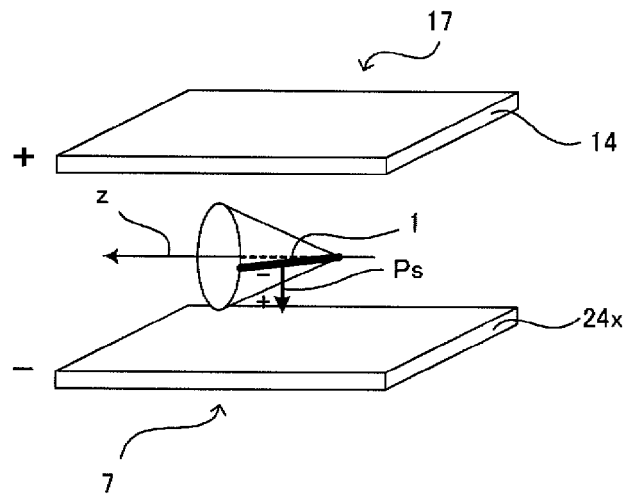
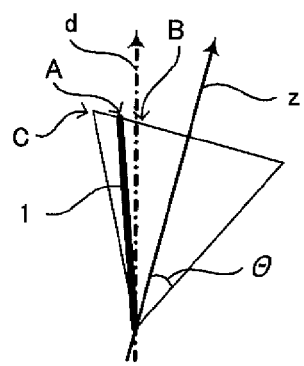
FIG. 12A
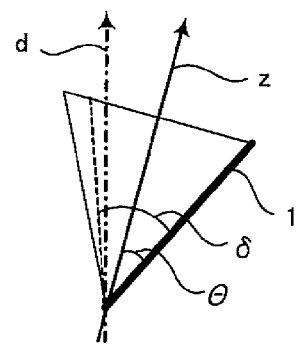
FIG. 12B
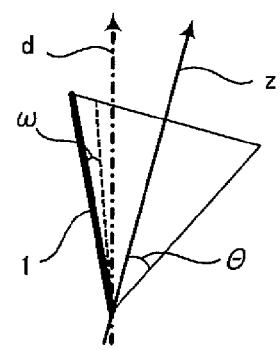
FIG. 12C
FIG. 13A
FIG. 13B
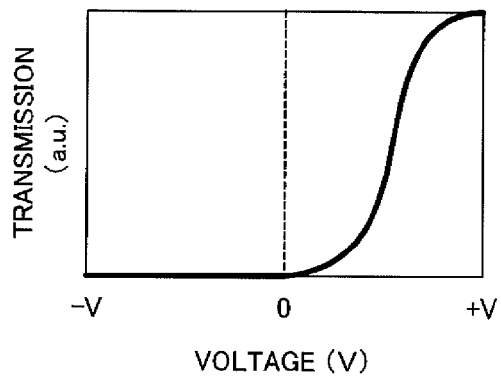
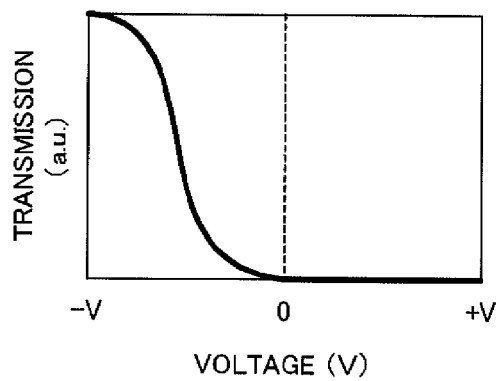

LIQUID CRYSTAL DISPLAY HAVING PARTICULAR OBLIQUE VAPOR DEPOSITION-ALIGNMENT LAYER WITH FERROELECTRIC LIQUID CRYSTAL

TECHNICAL FIELD

The present invention relates to a liquid crystal display using a mono-stability type ferroelectric liquid crystal having spontaneous polarization.

BACKGROUND ART

Since liquid crystal displays have features of being thin, low in power consumption and others, the use thereof has been expanding in various articles from large-sized displays to portable information terminals and the development thereof has been actively made. Conventionally, for liquid crystal displays, a TN system, an STN multiplex driving system, an active matrix driving system in which thin film transistors (TFTs) are used in TN, and others have been developed and made practicable. However, since nematic liquid crystal is used therein, the response speed of the liquid crystal material is as small as several milliseconds to several tens of milliseconds and it cannot be said that these sufficiently cope with display of moving images.

Ferroelectric liquid crystal (FLC) exhibits a very fast response in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 17 upper graph). However, the liquid crystal has a problem that the liquid crystal has memory properties but gray scale display cannot be attained since the switching thereof is limited to two states, namely, bright and dark states.

In recent years, attention has been paid to ferroelectric liquid crystal in which the liquid crystal layer thereof is stable in a single state (herein after referred to as "monostable") when no voltage is applied thereto as a liquid crystal making it possible to attain gray scale display by the matter that the director (the inclination of the molecule axis) of the liquid crystal is continuously changed by a change in applied voltage so as to analogue-modulate the light transmission thereof (Non-Patent Document 1, FIG. 17 lower graphs). As the liquid crystal showing the mono-stability, ferroelectric liquid crystals having the phase change of cholesteric phase (Ch)-chiral smectic C phase (SmC*) without the transition to the smectic A (SmA) phase in the temperature lowering process are generally used (FIG. 18 upper part).

On the other hand, as the ferroelectric liquid crystal, there is a material having the phase change of cholesteric phase (Ch)-smectic A phase (SmA)-chiral smectic C phase (SmC*) so as to show the SmC* phase by passing through the SmA phase in the temperature lowering process (FIG. 18 lower part). Among the ferroelectric liquid crystal material reported so far, most of them are those having the latter phase sequence of passing through the SmA phase compared with the former material which does not pass the SmA phase. It is known that the latter ferroelectric liquid crystal having the phase sequence of passing through SmA phase in general has two stable states with respect to one layer normal line so as to show the bi-stability.

In recent years, color liquid crystal displays have been actively developed. The method for realizing color display is generally classified into a color filter system and a field sequential color system. The color filter system is a system of using a white light source as a back light and attaching a micro color filter in R, G or B color to each pixel, thereby realizing color display. On the other hand, the field sequential color system is a system of switching a back light into R, G, B, R, G, B . . . with time, and opening and shutting a black and white shutter of a ferroelectric liquid crystal in synchronization therewith to mix the colors with time by afterimage effect on the retina, thereby realizing color display. This field sequential color system makes it possible to attain color display in each pixel, and does not require any color filter low in transmission. As a result, this system is useful since the system is capable of attaining bright and highly precise color display and realizing low power consumption and low costs.

The field sequential color system is a system in which each pixel is subjected to time sharing; it is therefore necessary for the liquid crystal as the black and white shutter to have high speed response properties in order to give good moving image display properties. If ferroelectric liquid crystal is used, this problem can be solved. The ferroelectric liquid crystal used at this time is, in particular, desirably a liquid crystal exhibiting mono-stability in order to make gray scale display based on analogue modulation possible and realize highly precise color display, as described above. As the ferroelectric liquid crystal exhibiting mono-stability, there are a ferroelectric liquid crystal which responds to both of plus-polarized and minus-polarized voltages (FIG. 17 right lower graph) and a ferroelectric liquid crystal which responds only to either of plus- or minus-polarized voltage (FIG. 17 left lower graph). When a ferroelectric liquid crystal is driven by using a thin film transistor (TFT) element, it is particularly preferable to use the ferroelectric liquid crystal which responds only to either of plus- or minus-polarized voltage since effect of inversion current generated by spontaneous polarization is less.

Herein, FIG. 19 shows an example of a driving sequence of a liquid crystal display based on a field sequential color system using a TFT element. In FIG. 19, it is supposed that the voltage applied to the liquid crystal display is set into the range of 0 to ±V (V), data-writing scanning is attained through a plus-polarized voltage, and data-erasing scanning is attained through a minus-polarized voltage. It is also supposed that a ferroelectric liquid crystal used exhibits monostability and responds to only either of plus- or minus-polarized voltage.

As illustrated in FIGS. 13A and 13B, the response of the ferroelectric liquid crystal which exhibits mono-stability and responds to only either of plus- or minus-polarized voltage is classified to a case that the liquid crystal gives a response to a plus-polarized voltage to turn into a bright state (FIG. 13A), and a case that the liquid crystal gives a response to a minus-polarized voltage to turn into a bright state (FIG. 13B) As illustrated in FIG. 19, therefore, in the case of using the ferroelectric liquid crystal exhibiting the response illustrated in FIG. 13A (liquid crystal response 1), the liquid crystal turns into a bright state when a plus-polarized voltage is applied thereto. In the case of using the ferroelectric liquid crystal exhibiting the response illustrated in FIG. 13B (liquid crystal response 2), the liquid crystal turns into a bright state when a minus-polarized voltage is applied thereto.

The ferroelectric liquid crystal using a TFT element is driven by applying a certain voltage to a common electrode of a common electrode substrate facing to a TFT substrate and by applying a voltage to a pixel electrode of each pixel in the TFT substrate. Here, the application of a plus-polarized denotes to a case when the voltage applied to the pixel electrode is relatively higher than the voltage applied to the common electrode, and the application of a minus-polarized voltage denotes to a case when the voltage applied to the pixel electrode is relatively lower than the voltage applied to the common electrode.

When the ferroelectric liquid crystal which responds only to a plus-polarized voltage is used as a ferroelectric liquid crystal, an application of plus-polarized voltage (writing) and an application of minus-polarized voltage (erasing) are conducted in turn to strike a balance in charges. When a TFT element is used to drive a ferroelectric liquid crystal, voltages cannot be written into all the pixels simultaneously and scanning is performed in after another line. Thus, when scanning is performed from a first line to an $L^{th}$ line, a time gap is generated between the writing scanning. Time gap is also generated in erasing scanning. In an example shown in FIG. 19, erasing scanning starts from a first line after all the writing scanning are completed.

Further, in a field sequential color system, writing scanning and erasing scanning are performed in synchronization with the flashing of the used back light. In FIG. 19, "+(R)" represents a matter that writing scanning (the application of a plus-polarized voltage) is performed in synchronization with a red (R) back light, and "−(R)" represents a matter that erasing scanning (the application of a minus-polarized voltage) is performed in synchronization with the red (R) back light. Similarly, "+(G)", "−(G)", "+(B)", and "−(B)" represent matters that the scanning operations are performed in synchronization with a green (G) backlight and a blue (B) backlight, respectively.

As described above, in a field sequential color system, writing scanning and erasing scanning are performed in synchronization with the switching of the used back light into R, G, B, . . . with time, thereby causing the ferroelectric liquid crystal to respond. Accordingly, when scanning is performed in synchronization with the back light R, the liquid crystal turns into a bright state during the lighting of the back light R in each of the writing scanning (+(R)) on the first line and the writing scanning (+(R)) on the $L^{th}$ line in the case of using the ferroelectric liquid crystal exhibiting the liquid crystal response 1. On the other hand, in the case of using the ferroelectric liquid crystal exhibiting the liquid crystal response 2, a time gap is generated in writing scanning (+(R)) and erasing scanning (−(R)) between the first line and the $L^{th}$ line. Accordingly, by the erasing scanning (−(R)) on the $L^{th}$ line in synchronism with the back light R, the liquid crystal turns unfavorably into a bright state when the back light G lights (broad line frames in FIG. 19). When scanning is performed in synchronization with the back light G, erasing scanning (−(G)) on the $L^{th}$ line in synchronization with the back light G causes the following: the liquid crystal turns unfavorably into a bright state when the back light B lights (broad line frames in FIG. 19).

In FIG. 19, "Bright (R)" represents a matter that the liquid crystal turns into a bright state by scanning in synchronization with the back light R (red), and "Dark" represents a matter that the liquid crystal turns into a dark state by scanning in synchronization with each of the back light R (red), G (green) and B (blue). In the same manner, "Bright (G)" and "Bright (B)" represent matters that the liquid crystal turns into a bright state by scanning in synchronization with the back lights G (green) and B (blue), respectively.

In common liquid crystal display devices, it is generally decided that writing scanning and erasing scanning are each performed by either one of plus-polarized and minus-polarized voltages and cannot be changed easily; therefore, in order to avoid the above-mentioned problems, it is necessary to adjust the polarity of the voltage to which the ferroelectric liquid crystal exhibiting mono-stability responds to the polarity of the voltage applied. This response of the ferroelectric liquid crystal is decided by the direction of spontaneous polarization of the ferroelectric liquid crystal. Therefore, the polarity of the voltage to which the ferroelectric liquid crystal responds can be controlled if the direction of the spontaneous polarization can be controlled.

Ferroelectric liquid crystal has a higher molecule order than nematic liquid crystal, so as not to be aligned with ease. In particular, in ferroelectric liquid crystal which does not pass Sma phase, two domains different in the layer normal line direction (referred to as the "double domains" herein after) are generated. In such double domains, white-black reversed display is generated when the liquid crystal is driven. This becomes a serious problem. For this reason, various alignment treatments are being investigated.

As a method for overcoming the double domains, known is, for example, the electric field induced technique of heating a liquid crystal cell to a temperature not lower than the cholesteric phase, and cooling the liquid crystal cell gradually while applying a DC voltage thereto (see Non-Patent Document 2). When this electric field induced technique is used, the direction of the spontaneous polarization can be controlled in F accordance with the direction of the applied electric field. According to this method, however, if the temperature is raised again to the phase transition point or higher, alignment disorder is generated. Moreover, manufacturing process becomes complicated and there is caused a problem such as that alignment disorder is generated in the region on which the electric field does not act between pixel electrodes.

As a method to mono-stabilize a ferroelectric liquid crystal, a method of using photo alignment layer as the upper and lower alignment layers, wherein a material having different composition is used for each of the photo alignment layers, is proposed (Patent Documents 1-3). The reasons of obtaining a good alignment state by employing a material having different composition for the each of the upper and lower photo alignment layers are not clear, but it is thought to be a difference in interaction between the respective photo alignment layer and the ferroelectric liquid crystal. A direction of spontaneous polarization of liquid crystal display obtained by such a method, however, cannot be known until the liquid crystal display is actually driven.

As another method to mono-stabilize a ferroelectric liquid crystal, a method, wherein a reactive liquid crystal is coated to either of the upper and lower alignment layers to align and fix the liquid crystal, and a fixed liquid crystal layer (reacted liquid crystal layer) is formed to make the fixed liquid crystal layer act as an alignment layer, is proposed (Patent Document 4). In this method, since the structure of a reactive liquid crystal is relatively similar to that of a ferroelectric liquid crystal, an interaction between the alignment layer and the ferroelectric liquid crystal becomes strong. Thus, an alignment of liquid crystal can be controlled more effectively than a case of using only photo alignment layers, and the ferroelectric liquid crystal can be aligned without causing alignment defects such as double domains by forming a fixed liquid crystal layer to either of the upper and lower alignment layers. However, a direction of spontaneous polarization of liquid crystal display obtained by such a method cannot also be known until it is actually driven.

Patent Document 1: Japanese Patent Application Publication 2005-208353

Patent Document 2: Japanese Patent Application Publication 2005-234549

Patent Document 3: Japanese Patent Application Publication 2005-234550

Patent Document 4: Japanese Patent Application Publication 2005-258428

Non-Patent Document 1: NONAKA, T., LI, J., OGAWA, A., HORNUNG, B., SCHMIDT, W., WINGEN, R., and DUBAL, H., 1999, Liq. Cryst., 26, 1599.

Non-Patent Document 2: PATEL, J., and GOODBY, J. W., 1986, J. Appl. Phys., 59, 2355.

DISCLOSURE OF THE INVENTION

Problems to be Solved by the Invention

The present invention has been made in light of the above-mentioned problems, and a main object thereof is to provide a liquid crystal display, using a ferroelectric liquid crystal exhibiting mono-stability, which makes it possible to control the direction of the spontaneous polarization of the ferroelectric liquid crystal.

Means for Solving the Problems

To attain the object, the present invention provides liquid crystal display comprising: a first alignment treatment substrate having a first substrate, a first electrode layer formed on the first substrate, and an oblique vapor deposition-alignment layer formed on the first electrode layer; a second alignment treatment substrate having a second substrate, a second electrode layer formed on the second substrate, an alignment layer for reactive liquid crystal formed on the second electrode layer, and a fixed liquid crystal layer (reacted liquid crystal layer) which is formed on the alignment layer for reactive liquid crystal and obtained by fixing a reactive liquid crystal; and a ferroelectric liquid crystal held between the oblique vapor deposition-alignment layer of the first alignment treatment substrate and the fixed liquid crystal layer of the second alignment treatment substrate; in which the first alignment treatment substrate and the second alignment treatment substrate are provided such that the oblique vapor deposition-alignment layer and the fixed liquid crystal layer face each other, characterized in that the ferroelectric liquid crystal exhibits mono-stability, and further characterized in that a molecular direction of the ferroelectric liquid crystal is changed by about 2 times a tilt angle of the ferroelectric liquid crystal parallel to a surface of the first alignment treatment substrate when a negative voltage is applied to the second electrode layer.

According to the present invention, the direction of the positive electrode of the spontaneous polarization of the ferroelectric liquid crystal tends not to direct toward the fixed liquid crystal layer side but to direct toward the oblique vapor deposition-alignment layer side. By utilizing this tendency, the direction of the spontaneous polarization of the ferroelectric liquid crystal can be controlled to thereby mono-stabilize the alignment of the ferroelectric liquid crystal. The reactive liquid crystal is aligned by the alignment layer for reactive liquid crystal and the fixed liquid crystal layer functions as an alignment layer that aligns the ferroelectric liquid crystal. Moreover, because the reactive liquid crystal has a structure relatively similar to that of the ferroelectric liquid crystal, there is a strong interaction between the reactive liquid crystal and the ferroelectric liquid crystal and therefore, the alignment of the ferroelectric liquid crystal can be controlled more efficiently than in the case of using only the alignment layer. The molecular direction of the ferroelectric liquid crystal used in this embodiment is changed by about 2 times a tilt angle when a negative voltage is applied to the second electrode layer. Therefore, when the liquid crystal display is driven by the field sequential color system, such a disorder as described in the aforementioned column "Background Art" can be avoided because the direction of the spontaneous polarization of the liquid crystal molecule is controllable.

In the above-mentioned invention, the alignment layer for reactive liquid crystal is preferably a photo alignment layer. Since the photo alignment layer is a layer treated by a photo alignment treatment and the photo alignment treatment is a non-contact alignment treatment, it is advantageous in that the quantitative alignment treatment control can be enabled without generation of the static electricity or the dust.

The alignment layer for reactive liquid crystal is preferably an oblique vapor deposition layer. The reason is as follows: the oblique vapor deposition layer is formed by an oblique vapor deposition method, and because, like the photo alignment treatment, the oblique vapor deposition method is non-contact alignment treatment, it is free from the generation of static electricity and dusts, enabling quantitative alignment treatment under control. In the case of the oblique vapor deposition layer using an inorganic material, there is also the advantage that this layer is not deteriorated by environmental factors (light, heat and moisture) and therefore, stable quality is easily obtained.

In the present invention, it is preferred that the first alignment treatment substrate is a TFT substrate having a thin film transistor (TFT) formed on the first substrate, and the second alignment treatment substrate is a common electrode substrate in which the second electrode layer is a common electrode. Such a structure makes it possible that when the switch of the TFT elements turns off, light leakage is prevented near the gate electrode.

The present invention further provides a liquid crystal display comprising: a first alignment treatment substrate having a first substrate, a first electrode layer formed on the first substrate, and an oblique vapor deposition-alignment layer formed on the first electrode layer; a second alignment treatment substrate having a second substrate, a second electrode layer formed on the second substrate, and a photo alignment layer which is formed on the second electrode layer and using a photo-isomerization type material which imparts anisotropy to an alignment layer by generating a photo-isomerization reaction; and a ferroelectric liquid crystal held between the oblique vapor deposition-alignment layer of the first alignment treatment substrate and the photo alignment layer of the second alignment treatment substrate; in which the first alignment treatment substrate and the second alignment treatment substrate are provided such that the oblique vapor deposition-alignment layer and the photo alignment layer face each other, characterized in that the ferroelectric liquid crystal exhibits mono-stability, and further characterized in that a molecular direction of the ferroelectric liquid crystal is changed by about 2 times a tilt angle of the ferroelectric liquid crystal parallel to a surface of the first alignment treatment substrate when a negative voltage is applied to the first electrode layer.

In the present invention, the direction of the positive electrode of the spontaneous polarization of the ferroelectric liquid crystal tends not to direct toward the oblique vapor deposition layer side but to direct toward the side of the photo alignment layer using the photo-isomerization type material. By utilizing this tendency, the direction of the spontaneous polarization of the ferroelectric liquid crystal can be controlled to thereby mono-stabilize the alignment of the ferroelectric liquid crystal. The molecular direction of the ferroelectric liquid crystal used in the invention is changed by about 2 times a tilt angle when a negative voltage is applied to the first electrode layer. Therefore, when the liquid crystal display is driven by the field sequential color system, such a disorder as described in the aforementioned column "Background Art" can be avoided because the direction of the spontaneous polarization of the liquid crystal molecule is controllable.

In the invention, it is preferable that the first alignment treatment substrate is a common electrode substrate in which the first electrode layer is a common electrode, and the second alignment treatment substrate is a TFT substrate having a thin film transistor (TFT) formed on the second substrate. Such a structure makes it possible to prevent light leakage near the gate electrode when the switch of the TFT elements turns off.

The liquid crystal display in the present invention is preferably driven by an active matrix system using a thin film transistor. This is because the adoption of the active matrix system using TFT elements makes it possible to switch on or off the target pixels surely to give high-quality display.

Moreover, the liquid crystal display of the present invention is suited to be displayed by a field sequential color system. This is because the ferroelectric liquid crystal shows monostability and enables gray scale display, and also because a highly precise, low-power consumption and low cost display of color moving images with a wide viewing angle can be realized by displaying the field sequential color system.

Effect of the Invention

The present invention produces such an effect that the direction of the spontaneous polarization of the ferroelectric liquid crystal can be controlled by utilizing the phenomenon that the direction of the positive electrode of the spontaneous polarization of the ferroelectric liquid crystal tends to direct toward the oblique vapor deposition-alignment layer side when the ferroelectric liquid crystal is held between the oblique vapor deposition-alignment layer and the fixed liquid crystal layer. In addition, the present invention produces such an effect that the direction of the spontaneous polarization of the ferroelectric liquid crystal can be controlled by utilizing the phenomenon that the direction of the positive electrode of the spontaneous polarization of the ferroelectric liquid crystal tends to direct toward the side of the photo alignment layer using the photo-isomerization type material when the ferroelectric liquid crystal is held between the oblique vapor deposition-alignment layer and the photo alignment layer using the photo-isomerization type material.

BRIEF DESCRIPTION OF THE DRAWINGS

FIGS. 1A to 1C are each a schematic diagram showing the behavior of the liquid crystal molecule.

FIG. 2 is a schematic sectional view illustrating one example of the liquid crystal display of the present invention.

FIG. 3 is a schematic view illustrating an example of the alignment state of a ferroelectric liquid crystal.

FIG. 11 is a schematic view illustrating another example of the alignment state of a ferroelectric liquid crystal.

FIGS. 12A to 12C are each a schematic view illustrating another example of the alignment state of a ferroelectric liquid crystal.

FIGS. 13A and 13B are each a graph showing changes in transmission to a voltage applied to ferroelectric liquid crystals.

EXPLANATION OF REFERENCE

Figure 4:
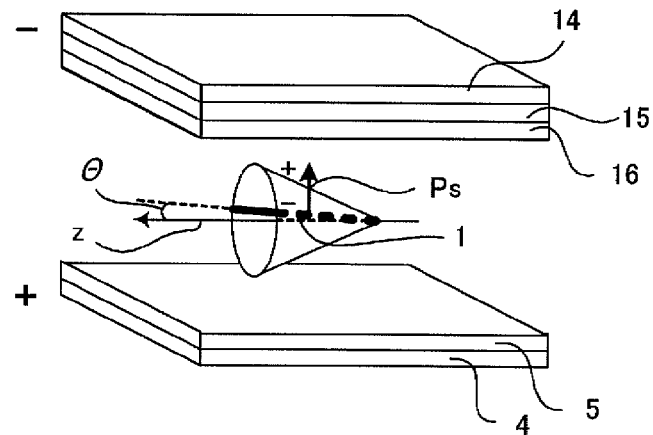
FIG. 4 is a schematic view illustrating another example of the alignment state of the ferroelectric liquid crystal.

1 Liquid crystal molecule
3 First substrate
4 First electrode layer
5 Oblique vapor deposition-alignment layer
7 First alignment treatment substrate
10 Liquid crystal layer
13 Second substrate
14 Second electrode layer
15 Alignment layer for reactive liquid crystal
16 Fixed liquid crystal layer
17 Second alignment treatment substrate
19 Photo-isomerization type photo-alignment layer
z layer normal line
Ps spontaneous polarization

PREFERRED EMBODIMENT OF THE INVENTION

The present invention is divided into two embodiments by the structure of the second alignment treatment substrate. Each of the embodiments is explained separately.

I. First Embodiment

The inventors of the present invention conducted the following experiments to examine the direction of the spontaneous polarization of a ferroelectric liquid crystal as a factor of the polarization of applied voltage.

First, a liquid crystal display in which a ferroelectric liquid crystal was held between an oblique vapor deposition-alignment layer and a fixed liquid crystal layer was manufactured.

A 2 wt % cyclopentanone solution that was a photo-dimerization type material (trade name: ROP103, manufactured by Rolic Technologies) was applied to the surface of two glass substrates on which an ITO electrode was formed respectively, by spin coating at a rotation of 1500 rpm for 15 seconds and then dried at 130° C. for 15 minutes. Then, the glass substrates were irradiated with linearly polarized ultra violet rays at a dose of about 100 mJ/cm² to carry out alignment treatment. Moreover, a 2 wt % cyclopentanone solution of a reactive liquid crystal (trade name: ROF-5101, manufactured by Rolic Technologies) containing an acrylate monomer was applied to and laminated on the above coating layers by spin coating at a rotation of 1500 rpm for 15 seconds, dried at 55° C. for 3 minutes and then, irradiated with non-polarized ultra violet rays at 55° C. at a dose of 1000 mJ/cm².

Then, silicon oxide was vapor-deposited on the glass substrates with an ITO electrode formed thereon respectively, from an oblique direction at an incident angle of 50° to 55° with the normal axis of the surface of the substrates to form an oblique vapor deposition-alignment layer respectively. The layer thickness of each of the oblique vapor deposition-alignment layers was 50 nm.

Thereafter, beads spacers each 1.5 μm in size were spread on one of the substrates and a seal agent was applied to the other substrate by using a seal dispenser. The both substrates were fabricated in such a manner that the direction of vapor deposition was perpendicular to the direction of the linearly polarized ultra violet rays and then thermally applied to each other under pressure. A ferroelectric liquid crystal (trade name: R2301, manufactured by AZ Electronic Materials) was attached to the upper part of the injecting opening to inject the liquid crystal at a temperature higher than the N-phase-isotropic phase transition temperature by 10° C. to 20° C. and then, the temperature was slowly returned to room temperature.

When a negative voltage was applied to the electrode layer of the fixed liquid crystal layer side, the molecular direction of the ferroelectric liquid crystal is changed about 2 times a tilt angle of the ferroelectric liquid crystal. About 82% of all ferroelectric liquid crystals varied in molecular direction about 2 times a tilt angle.

The source of vapor deposition of the oblique vapor deposition-alignment layer, the type of reactive liquid crystal and their combinations were changed to form liquid crystal displays in which, like the above liquid crystal displays, a ferroelectric liquid crystal was held between the oblique vapor deposition-alignment layer and the fixed liquid crystal layer. With regard to these liquid crystal displays, the same results were obtained.

Next, a liquid crystal display in which a ferroelectric liquid crystal was held between a pair of fixed liquid crystal layers was manufactured.

A 2 wt % cyclopentanone solution that was a photo-dimerization type material (trade name: ROP103, manufactured by Rolic Technologies) was applied to the surface of each of two glass substrates on which an ITO electrode was formed, by spin coating at a rotation of 1500 rpm for 15 seconds and then dried at 130° C. for 15 minutes. Then, the glass substrates were irradiated with linearly polarized ultra violet rays at a dose of about 100 mJ/cm² to carry out alignment treatment. Moreover, a 2 wt % cyclopentanone solution of a reactive liquid crystal (trade name: ROF-5101, manufactured by Rolic Technologies) containing an acrylate monomer was applied to and laminated on the above coating layers by spincoating at a rotation of 1500 rpm for 15 seconds, dried at 55° C. for 3 minutes and then, irradiated with non-polarized ultra violet rays at 55° C. at a dose of 1000 mJ/cm².

After that, beads spacers each 1.5 μm in size were spread on one of the substrates and a seal agent was applied to the other substrate by using a seal dispenser. The both substrates were fabricated in such a manner that the directions of the polarized ultra violet rays to be applied were parallel to each other and then thermally applied to each other under pressure. A ferroelectric liquid crystal (manufactured by AZ Electronic Materials, trade name "R2301") was caused to adhere onto the upper part of the injecting opening. An oven was used to inject the liquid crystal at a temperature higher than the namatic phase/isotropic phase transition temperature by 10 to 20° C., and the temperature was slowly returned to room temperature. When a negative voltage was applied to the electrode layer of one substrate, the molecular directions of part of the ferroelectric liquid crystals were changed by about 2 times the tilt angle. However, the molecular directions of some ferroelectric liquid crystals were not changed. The ratio of the molecules of the ferroelectric liquid crystal in which the molecular directions were changed by about 2 times the tilt angle was approximately 50% of all the molecules.

The type of reactive liquid crystal and the combinations were changed to form liquid crystal displays in which, like the above liquid crystal displays, a ferroelectric liquid crystal was held between the pair of fixed liquid crystal layers. With regard to these liquid crystal displays, the same results were obtained.

From the results of the above experiments, such teaching has been obtained that when the ferroelectric liquid crystal is held between the fixed liquid crystal layer and the oblique vapor deposition-alignment layer, the direction of the positive electrode of the spontaneous polarization of the ferroelectric liquid crystal tends to direct toward the oblique vapor deposition-alignment layer side.

Hereinafter, a liquid crystal display of the present embodiment will be explained in detail.

The liquid crystal display of the first embodiment comprises: a first alignment treatment substrate having a first substrate, a first electrode layer formed on the first substrate, and an oblique vapor deposition-alignment layer formed on the first electrode layer; a second alignment treatment substrate having a second substrate, a second electrode layer formed on the second substrate, an alignment layer for reactive liquid crystal formed on the second electrode layer, and a fixed liquid crystal layer which is formed on the alignment layer for reactive liquid crystal and obtained by fixing a reactive liquid crystal; and a ferroelectric liquid crystal held between the oblique vapor deposition-alignment layer of the first alignment treatment substrate and the fixed liquid crystal layer of the second alignment treatment substrate; in which the first alignment treatment substrate and the second alignment treatment substrate are provided such that the oblique vapor deposition-alignment layer and the fixed liquid crystal layer face each other, characterized in that the ferroelectric liquid crystal exhibits mono-stability, and further characterized in that a molecular direction of the ferroelectric liquid crystal is changed by about 2 times a tilt angle of the ferroelectric liquid crystal parallel to a surface of the first alignment treatment substrate when a negative voltage is applied to the second electrode layer.

The ferroelectric liquid crystal used in the present embodiment is, as mentioned above, a ferroelectric liquid crystal which exhibits mono-stability and whose molecular direction is changed by about 2 times a tilt angle of the ferroelectric liquid crystal parallel to a surface of the first alignment treatment substrate when a negative voltage is applied to the second electrode layer.

As shown in FIGS. 1A to 1C, in the ferroelectric liquid crystal, each of the liquid crystal molecules 1 is inclined from a layer normal line z, and rotates along the edge line of a cone having a bottom plane perpendicular to the layer normal line z. In this cone, the inclination angle of the liquid crystal molecules 1 to the layer normal line z is defined as the tilt angle θ.

The wording "exhibiting mono-stability" means that the state of a ferroelectric liquid crystal is stabilized in a single state when no voltage is applied thereto. Specifically, as illustrated in FIGS. 1A to 1C, each of the liquid crystal molecules 1 can move on the cone between two states that the molecule is inclined by tilt angles of ±θ to the layer normal line z; the wording means that the liquid crystal molecule 1 is stabilized in any one state between the states on the cone when no voltage is applied thereto.

With reference to the drawings, the liquid crystal display of the present embodiment will be explained.

FIG. 2 is a schematic sectional view illustrating an example of the liquid crystal display of the invention. In the liquid crystal display 2 illustrated in FIG. 2, a first alignment treatment substrate 7 in which a first electrode layer 4 and an oblique vapor deposition-alignment layer 5 are successively formed on a first substrate 3, and a second alignment treatment substrate 17 in which a second electrode layer 14, a reacted-liquid crystal layer-alignment layer 15 and a fixed liquid crystal layer 16 are successively formed on a second substrate 13 are facing each other, and a ferroelectric liquid crystal is held between the oblique vapor deposition-alignment layer 5 of the first alignment-treatment substrate 7 and the fixed liquid crystal layer 16 of the second alignment treatment substrate 17 to constitute a liquid crystal layer 10. The oblique vapor deposition-alignment layer 5 and the fixed liquid crystal layer 16 are disposed such that the direction of the vapor deposition of the oblique vapor deposition-alignment layer is substantially perpendicular to the direction of the alignment treatment of the alignment layer for reactive liquid crystal.

From the results of the above experiments, such teaching has been obtained that when the ferroelectric liquid crystal is held between the oblique vapor deposition-alignment layer and the fixed liquid crystal layer, the direction of the positive electrode of the spontaneous polarization of the ferroelectric liquid crystal tends to direct toward the oblique vapor deposition-alignment layer side. The reason of the above is thought to be an effect of a polar surface interaction, which is an interaction between the ferroelectric liquid crystal, and the oblique vapor deposition-alignment layer surface and fixed liquid crystal layer surface.

An example of the alignment state of the ferroelectric liquid crystal used in the present embodiment is shown in FIG. 3. According to the above-mentioned results of the experiments, the fixed liquid crystal layer posses a tendency to have a stronger plus polarity when the oblique vapor deposition-alignment layer and the fixed liquid crystal layer are compared. As shown in FIG. 3, polar surface interaction makes the spontaneous polarization Ps of the liquid crystal molecule 1 to have a tendency to be directed to the side of the oblique vapor deposition-alignment layer 5 when no voltage is applied. In FIG. 3, the first substrate and the second substrate are omitted and the liquid crystal molecule shows the ferroelectric liquid crystal.

As illustrated in FIG. 4, when the positive voltage is applied to the first electrode layer 4 and the negative voltage to the second electrode layer 14, the spontaneous polarization Ps of the liquid crystal molecules 1 is directed to the side of the fixed liquid crystal layer 16 by the effect of the polarity of the applied voltage. In FIG. 4, the first substrate and the second substrate are omitted, and a liquid crystal molecule shows the ferroelectric liquid crystal.

Furthermore, when a negative voltage is applied to the first electrode layer and a positive voltage to the second electrode layer, the spontaneous polarization Ps of the liquid crystal molecules 1 is directed to the side of the oblique vapor deposition-alignment layer 5 by the effect of the polarity of the applied voltage, as illustrated in FIG. 3. In this case, the direction of the spontaneous polarization is the same as in the non-voltage-applying state.

The direction of spontaneous polarization becomes directed to the direction mentioned-above is because the direction of spontaneous polarization is directed to a direction where polarization of the ferroelectric liquid crystal and polarization of the alignment layer or polarity of the voltage applied strike an electrical balance so that the liquid crystal molecules are made in an electrically stable state.

Figure 5:
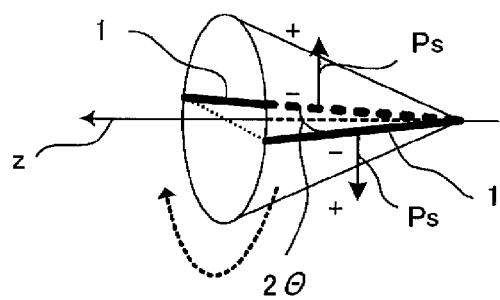
FIG. 5 is an explanatory view illustrating the spontaneous polarization of a ferroelectric liquid crystal.

When the liquid crystal display is made from the non-voltage-applying state or the state when the positive voltage is applied to the second electrode layer (FIG. 3) to the state when the minus voltage is applied to the second electrode layer (FIG. 4), the liquid crystal molecule 1 is rotated by an angle of about 2θ, as illustrated in FIG. 5, by repulsion between the minus polarity of this applied voltage and the minus polarity of the spontaneous polarization of the liquid crystal molecule. In other words, when a negative voltage is applied to the second electrode layer, the molecular direction of the ferroelectric liquid crystal is changed to parallel to the first alignment treatment substrate surface by about 2 times the tilt angle θ of the ferroelectric liquid crystal.

As described above, in the present embodiment, the direction of the spontaneous polarization of the liquid crystal molecule can be controlled by utilizing the tendency that the positive electrode of the spontaneous polarization of the ferroelectric liquid crystal directs to the side of the oblique vapor deposition-alignment layer.

When the fixed liquid crystal layer is formed on the alignment layer for reactive liquid crystal, the reactive liquid crystal is aligned by an alignment layer for reactive liquid crystal and then, irradiated with, for example, ultra violet rays to polymerize the reactive liquid crystal, whereby the alignment state of the reactive liquid crystal can be fixed. Therefore, the ability to control the alignment of the alignment layer for reactive liquid crystal can be imparted to the fixed liquid crystal layer with the result that the fixed liquid crystal layer can be made to act as the alignment layer that aligns the ferroelectric liquid crystals. Since the reactive liquid crystal is fixed, there is the advantage that the liquid crystal display is unaffected by factors such as temperature. Moreover, the reactive liquid crystal has a structure relatively similar to that of the ferroelectric liquid crystal, and therefore, there is a strong interaction between the both, making it possible to efficiently control the direction of the spontaneous polarization of the ferroelectric liquid crystal.

Figure 6A:
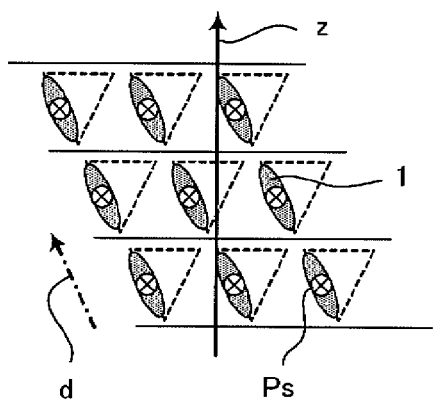
FIGS. 6A and 6B are each a schematic view illustrating another example of the alignment state of a ferroelectric liquid crystal.
Figure 6B:
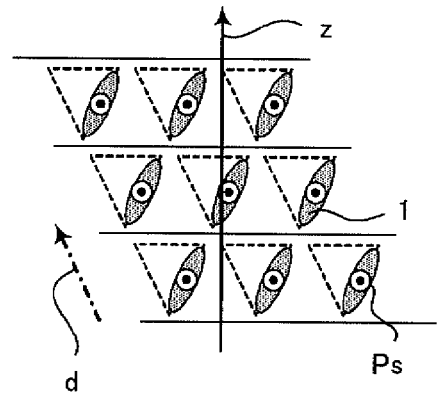

FIGS. 6A and 6B each shows an example of the state of the alignment of the ferroelectric liquid crystal used in this embodiment. In a liquid crystal display as shown in, for example, FIG. 2, a liquid crystal molecule 1 is aligned along the direction "d" of the alignment treatment of the alignment layer for reactive liquid crystal and is put into a uniform alignment state when no voltage is applied as illustrated in FIG. 6A. When the positive voltage is applied to the first electrode layer and the negative voltage to the second electrode layer, the spontaneous polarization Ps repels by the effect of the polarity of the applied voltage as illustrated in FIG. 6B. In this case, the liquid crystal display molecules 1 become in a uniform alignment state. Furthermore, when a negative voltage is applied to the first electrode layer and a positive voltage to the second electrode layer, the spontaneous polarization Ps repels by the effect of the polarity of the applied voltage, as illustrated in FIG. 6A. In this case, the liquid crystal molecules 1 turn into the same alignment state as in the non-voltage-applying state.

FIG. 6A is a schematic view illustrating the alignment state of the liquid crystal molecules from the top side in FIG. 3, in which the spontaneous polarization Ps is directed from the front side of the drawing paper to the back side of the drawing paper (x marks in FIG. 6A). FIG. 6B is a schematic view illustrating the alignment state of the liquid crystal molecules from the top side in FIG. 4, in which the spontaneous polarization Ps is directed from the back side of the drawing paper to the front side of the drawing paper (● marks in FIG. 6B).

In the present embodiment, since the direction of the spontaneous polarization can be controlled as mentioned above, no alignment defect is caused and alignment of the ferroelectric liquid crystal can be mono-stabilized. In other words, the ferroelectric liquid crystal exhibits mono-stability. Further, since the ferroelectric liquid crystal can be aligned without using the electric field induced technique, alignment of the ferroelectric liquid crystal can be maintained even if the temperature thereof rises to the phase transition temperature or higher, and thereby has an advantage of restraining the generation of alignment defects.

Figure 7A:
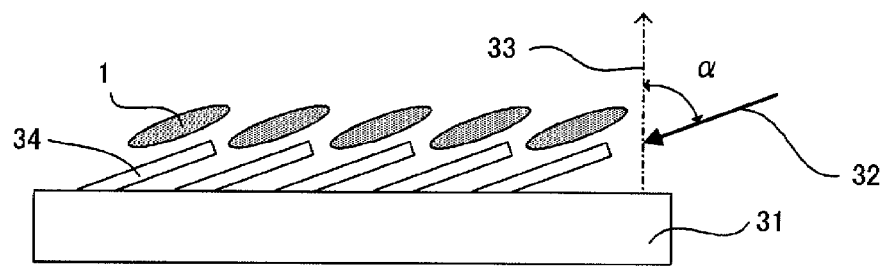
FIGS. 7A to 7C are each a typical view showing an oblique vapor deposition-alignment layer.

The oblique vapor deposition-alignment layer to be used in present embodiment is formed by the oblique vapor deposition method. Here, the oblique vapor deposition method is a method in which a molecule or an atom vaporized from a vaporization source is made to be incident to a substrate 31 from an oblique direction as shown in FIG. 7A. When the substrate 31 is made to incline with respect to a vapor deposition direction 32 to carry on vapor deposition such that the angle α (vapor deposition angle) formed between the direction (vapor deposition direction 32) of the vaporization source and the normal line of the surface of the substrate 31 falls in a specified range, fine crystals of $SiO_2$ or the like that is to be a thin layer grow in the direction of the vaporization source to form a columnar structure 34 that projects in an oblique direction and thus the liquid crystal molecule 1 is aligned along the side surface of the columnar structure 34. Therefore, the pre-tilt angle of the liquid crystal molecule can be controlled by adjusting the vapor deposition angle.

Generally, in liquid crystal displays using a ferroelectric liquid crystal, two alignment layers facing each other are provided in such a manner that the alignment treatment directions of these alignment layers are parallel to each other. Therefore, when the alignment layer for reactive liquid crystal is, for example, a photo alignment layer or a rubbed layer, the oblique vapor deposition-alignment layer and the fixed liquid crystal layer are provided such that the direction of the vaporization of the oblique vapor deposition-alignment layer is substantially perpendicular to the alignment treatment direction of the alignment layer for reactive liquid crystal. When the alignment layer for reactive liquid crystal is an oblique vapor deposition layer, the oblique vapor deposition-alignment layer and the fixed liquid crystal layer are provided such that the direction of the vapor deposition of the oblique vapor deposition-alignment layer is substantially parallel to the direction of the vaporization of the oblique vapor deposition layer.

Figure 7B:
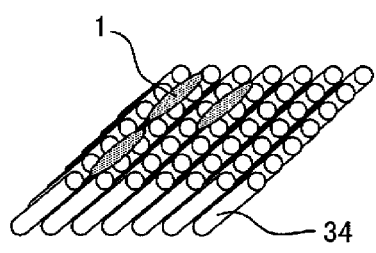
Figure 7C:
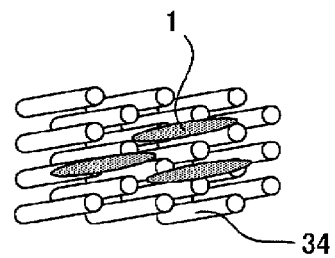

Here, it is known that the oblique vapor deposition-alignment layer has a channel structure and a columnar structure, and that the channel structure and the columnar structure are changed by the angle of the vapor deposition and the direction of the alignment of the liquid crystal is changed. It is also known that the angle and density of the columnar fine structure are changed by the angle of the vapor deposition (Liquid crystal handbook editorial committee, "CRYSTAL LIQUID HANDBOOK", Maruzen Co., Ltd., Oct., 30 (2000), p. 229-230). When the angle of the vapor deposition is, for example, around 50°, a columnar structure 34 is formed as illustrated in FIG. 7B, wherein a channel structure is formed in a direction substantially perpendicular to the direction of the vapor deposition source (direction of vapor deposition), whereby the liquid crystal molecule 1 is aligned in a direction substantially perpendicular to the direction of vapor deposition. On the other hand, when the angle of vapor deposition is 80° or more, a columnar structure 34 is formed as illustrated in FIG. 7C, wherein a channel structure is formed in a direction parallel to the direction of the vapor deposition source (direction of vapor deposition), whereby the liquid crystal molecule 1 is aligned in a direction substantially parallel to the direction of vapor deposition.

When, for example, the angle of vapor deposition is around 50°, the liquid crystal molecule is aligned in a direction substantially parallel to the direction of vapor deposition. Therefore, when the alignment layer for reactive liquid crystal is a photo alignment layer or a rubbed layer, the oblique vapor deposition-alignment layer and the fixed liquid crystal layer are provided such that the direction of the vapor deposition of the oblique vapor deposition-alignment layer is substantially perpendicular to the alignment treatment direction of the alignment layer for reactive liquid crystal. When the alignment layer for reactive liquid crystal is an oblique vapor deposition layer, the oblique vapor deposition-alignment layer and the fixed liquid crystal layer are provided such that the direction of the vapor deposition of the oblique vapor deposition-alignment layer is substantially parallel to the direction of the vapor deposition of the oblique vapor deposition layer.

In general, the ferroelectric liquid crystal having the phase sequence passing through Sma phase has the layer interval of the smectic layer shorten in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface, and thus it is problematic. It is effective to enlarge the pre-tilt angle to prevent the generation of such zigzag defect or the hairpin defect.

Since the oblique vapor deposition method can control the pre-tilt angle, the oblique vapor deposition-alignment layer can realize a larger pre-tilt angle. Therefore, by using the oblique vapor deposition-alignment layer, generation of zigzag defect or the hairpin defect can be restrained.

When a negative voltage is applied to the second electrode layer, the percentage of the ferroelectric liquid crystal molecules in which the molecular direction thereof is changed by about 2 times the tilt angle is preferably 80% or more, more preferably 90% or more, and most preferably 95% or more. When the percentage is in the above-mentioned range, a good contrast ratio can be obtained.

The above-mentioned percentage can be measured as follows.

Figure 8:
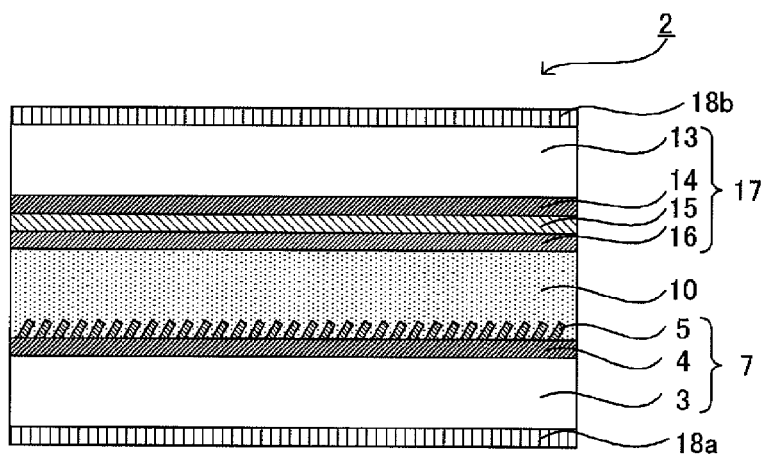
FIG. 8 is a schematic sectional view illustrating another example of the liquid crystal display of the present invention.

As illustrated in, for example, FIG. 8, the liquid crystal display comprises: the first alignment treatment substrate 7 having the first electrode layer 4 and the oblique vapor deposition-alignment layer 5 laminated on the first substrate 3; a second alignment treatment substrate 17 having the second electrode layer 14 and the alignment layer for reactive liquid crystal 15 and the fixed liquid crystal layer 16 laminated on the second substrate 13; and the liquid crystal layer 10 containing ferroelectric liquid crystal, in which the liquid crystal layer 10 is held between the first alignment treatment substrate 7 and the second alignment treatment substrate 17. Polarizing plates 18a and 18b are set up outside the first alignment treatment substrate 7 and the second alignment treatment substrate 17, respectively, and light is caused to go into the side of the polarizing plate 18a and caused to go out from the side of the polarizing plate 18b. The two polarizing plates 18a and 18b are provided to make the polarizing axes of the individual plates substantially perpendicular to each other and further make the polarizing axis of the polarizing plate 18a substantially parallel to the alignment treatment direction (the alignment direction of the liquid crystal molecules) of the alignment layer for reactive liquid crystal 15.

In a non-voltage-applying state, the linearly polarized light transmitted through the polarizing plate 18a is consistent with the alignment direction of the liquid crystal molecules; therefore, the refractive index anisotropy of the liquid crystal molecules is not expressed so that the linearly polarized light transmitted through the polarizing plate 18a passes, as it is, through the liquid crystal molecules and is then intercepted by the polarizing plate 18b. As a result, the liquid crystal display turns into a dark state. On the other hand, in a voltage-applying state, the liquid crystal molecules move on the cones so that the linearly polarized light transmitted through the polarizing plate 18a and the alignment direction of the liquid crystal molecules come to have a predetermined angle. Accordingly, the linearly polarized light transmitted through the polarizing plate 18a is turned to elliptically polarized light by the birefringence of the liquid crystal molecules. Out of rays of this elliptically polarized light, only linearly polarized light consistent with the polarizing axis of the polarizing plate 18b is transmitted through the polarizing plate 18b, so that the liquid crystal display turns into a bright state.

For this reason, in the case that a negative voltage is applied to the second electrode layer, a bright state is obtained when the molecular direction of the ferroelectric liquid crystal is changed by about 2 times the tilt angle. On the other hand, in the case that a negative voltage is applied to the second electrode layer, for example, the ferroelectric liquid crystal molecules having a molecular direction not changed are partially present in some case. In this case, a dark state is partially obtained. Accordingly, from the area ratio between the black and the white in a black and white (dark and bright) display obtained at the time of the application of a voltage, the ratio of the ferroelectric liquid crystal molecules where their molecular direction is changed by about 2 times the tilt angle when a negative voltage is applied to the first electrode can be calculated.

As described above, in the liquid crystal display in which the polarizing plates are set up, a dark state is generated in a non-voltage-applying state and in the state when a minus voltage is applied to the first electrode layer; while a bright state is generated in the state when a positive voltage is applied to the first electrode layer. Accordingly, when the liquid crystal display is displayed by a field sequential color system, the generation of a bright state can be avoided, for example, by scanning in synchronization with a back light R (red) when a back light G (green) lights on, as illustrated in FIG. 9.

Figure 9:
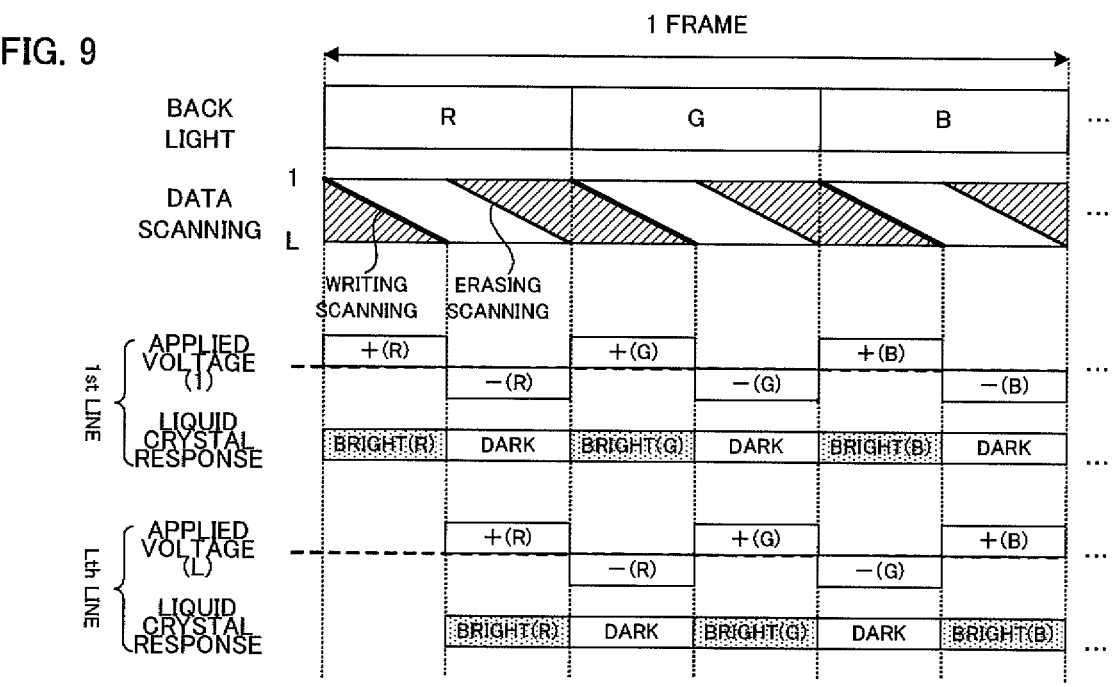
FIG. 9 is a conceptual diagram illustrating a driving sequence of a liquid crystal display based on a field sequential color system.
Figure 19:
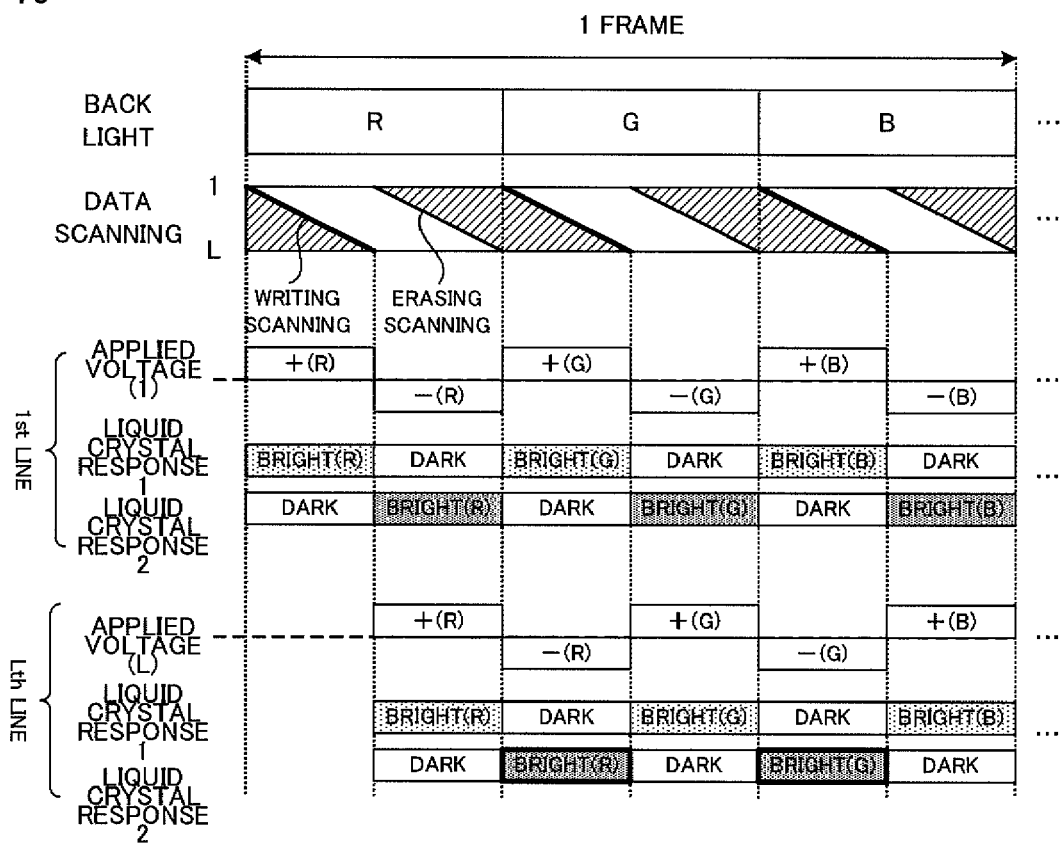
FIG. 19 is a conceptual diagram illustrating a driving sequence of a liquid crystal display based on a field sequential color system.

Symbols and so on in FIG. 9 are the same as described in FIG. 19.

Figure 10:
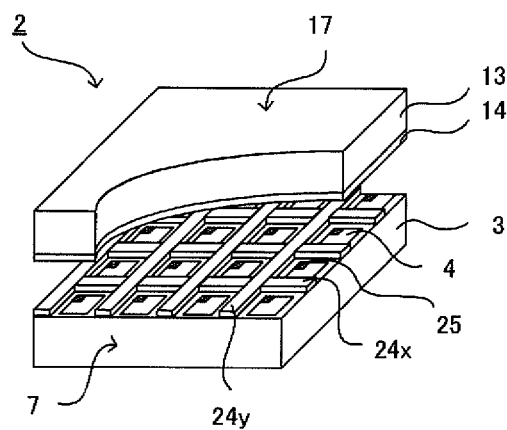
FIG. 10 is a schematic perspective view illustrating an example of the liquid crystal display of the invention.

The liquid crystal display of the present embodiment can be driven by an active matrix system using thin film transistors (TFTs). In this case, it is preferred that the first alignment treatment substrate is a TFT substrate having TFTs formed on the first substrate and the second alignment treatment substrate is a common electrode substrate, in which the second electrode layer is a common electrode. FIG. 10 is a schematic perspective view illustrating an example of a liquid crystal display based on an active matrix system using TFTs.

The liquid crystal display 2 illustrated in FIG. 10 has: a TFT substrate (first alignment treatment substrate 7), in which TFT elements 25 are provided in a matrix form on a first substrate 3, and a common electrode substrate (second alignment treatment substrate 17), in which a common electrode 14 is formed on a second substrate 13. In the TFT substrate (first alignment treatment substrate 7), gate electrodes 24x, source electrodes 24y and pixel electrodes (first electrode layer 4) are formed. The gate electrodes 24x and the source electrodes 24y are arranged lengthways and sideways, respectively. When signals are supplied to the gate electrodes 24x and the source electrodes 24y, the TFT elements 25 are operated so that the ferroelectric liquid crystal can be driven. Regions where the gate electrodes 24x and the source electrodes 24y cross each other are insulated with an insulating layer, which is not illustrated. Signals to the gate electrodes 24x can act independently from signals to the source electrodes 24y. Regions surrounded by the gate electrodes 24x and the source electrodes 24y are each a pixel, which is a minimum unit for driving the liquid crystal display of the present embodiment. In each of the pixels, one or more TFT elements 25 and one or more pixel electrodes (first electrode layer 4) are formed. By applying signal voltages successively to the gate electrodes and the source electrodes, the TFT elements in the individual pixels can be operated. In FIG. 10, a liquid crystal layer, an oblique vapor deposition-alignment layer, an alignment layer for reactive liquid crystal and a fixed liquid crystal layer are omitted.

When the gate electrodes are made into a high voltage of, for example, about 30 V in the above-mentioned liquid crystal display, the switches of the TFT elements turn on so that a signal voltage is applied to the ferroelectric liquid crystal through the source electrodes. When the gate electrodes are made into a low voltage of, for example, about −10 V, the switches of the TFT elements turn off. As illustrated in FIG. 11, in the state of switching-off, a voltage is applied to between the common electrode (second electrode layer 14) and the gate electrodes 24x so as to make the side of the common electrode (second electrode layer 14) positive. In this switching-off state, the ferroelectric liquid crystal does not act, so that the corresponding pixels turn into a dark state.

As described above, in the present embodiment, the spontaneous polarization of the liquid crystal molecules has a tendency to be directed to the side of the first alignment treatment substrate by polar surface interaction in a non-voltage-applying state. Specifically, as illustrated in FIG. 11, in the state of switching-off, the spontaneous polarization Ps of the liquid crystal molecules 1 is directed to the side of the TFT substrate (first alignment treatment substrate 7). Accordingly, the direction of the spontaneous polarization is not affected by the voltage applied to between the common electrode (second electrode layer 14) and the gate electrodes 24x.

On the other hand, for example, when the spontaneous polarization is directed to the common electrode substrate (second alignment treatment substrate) side in a non-voltage-applying state, the direction of the spontaneous polarization is reversed, near the regions where the gate electrodes are formed, by the effect of the voltage applied between the common electrode and the gate electrodes in the state of switching-off. As a result, near the regions where the gate electrodes are formed, the ferroelectric liquid crystal operates in spite of the switching-off state, so that light leaks.

In contrast, in the present embodiment, the direction of the spontaneous polarization is not affected by the voltage applied between the common electrode and the gate electrodes, as described above. As a result, no light is leaked. In the present embodiment, therefore, light leakage near the regions of the gate electrodes can be prevented by controlling the direction of the spontaneous polarization and rendering the second alignment treatment substrate a common electrode substrate.

Each of the constituent members of the liquid crystal display of the present embodiment will be described in detail herein after.

1. Liquid Crystal Layer

The ferroelectric liquid crystal used in the present embodiment exhibits mono-stability, and a molecular direction of the ferroelectric liquid crystal is changed by about 2 times a tilt angle of the ferroelectric liquid crystal parallel to a surface of the first alignment treatment substrate when a negative voltage is applied to the second electrode layer.

The wording "the molecular direction of the ferroelectric liquid crystal is changed by about 2 times the tilt angle θ of the ferroelectric liquid crystal to the first alignment treatment substrate surface when a negative voltage is applied to the second electrode layer" means the following: each of the liquid crystal molecules is stabilized into a single state on the cone when no voltage is applied thereto; when a negative voltage is applied to the second electrode layer, the liquid crystal molecule is inclined to one side on the cone from the mono-stability state; when a positive voltage is applied to the second electrode layer, the liquid crystal molecule is kept in the mono-stability state or is inclined from the mono-stability state to the side reverse to the side when a negative voltage is applied to the second electrode layer; and the inclination angle of the liquid crystal molecule from the mono-stability state when a negative voltage is applied to the second electrode layer is larger than the inclination angle of the liquid crystal molecule from the mono-stability state when a positive voltage is applied to the second electrode layer.

FIGS. 12A to 12C are each a schematic view illustrating an example of the alignment state of a ferroelectric liquid crystal exhibiting mono-stability. FIGS. 12A, 12B and 12C illustrate a case where no voltage is applied thereto, a case where a negative voltage is applied to the second electrode layer, and a case where a positive voltage is applied to the second electrode layer, respectively. In the non-voltage-applied case, each liquid crystal molecule 1 is stabilized into a single state on the cone (FIG. 12A). In the case where a negative voltage is applied to the second electrode layer, the liquid crystal molecule 1 is inclined from the stabilized state (broken line) to one side (FIG. 12B). In the case where a positive voltage is applied to the second electrode layer, the liquid crystal molecule 1 is inclined from the stabilized state (broken line) to the side reverse to the side when a negative voltage is applied to the second electrode layer (FIG. 12C). In this case, the inclination angle δ when the negative voltage is applied to the second electrode layer is larger than the inclination angle ω when the positive voltage is applied to the second electrode layer. In FIGS. 12A to 12C, "d" represents the direction of alignment treatment, and "z" represents a layer normal line.

When a negative voltage is applied to the second electrode layer, each of the liquid crystal molecules is inclined from the mono-stability state to one side on the cone at an angle corresponding to the applied voltage. As illustrated in FIG. 12A, in the ferroelectric liquid crystal, a position A (the direction of the liquid crystal molecule 1), a position B (the alignment treatment direction "d"), and a position C are not necessarily consistent with each other. As illustrated in FIG. 12B, therefore, the maximum inclination angle δ when a negative voltage is applied to the second electrode layer is about 2 times the tilt angle θ (angle 2θ).

As illustrated in, for example, FIG. 5, the direction of the liquid crystal molecules 1 is changed by about 2 times the tilt angle θ (angle 2θ) parallel to the first alignment treatment substrate surface. The wording "being changed by about 2 times the tilt angle θ" means a case of being changed by an angle of 2θ to 2θ–5°.

The angle where the molecular direction of the ferroelectric liquid crystal is changed parallel to the first alignment treatment substrate surface can be measured as follows. First, a polarizing microscope in which polarizing plates are provided under a Crossed Nicol condition and a liquid crystal display are positioned to make the polarizing axis of one of the polarizing plates parallel to the alignment direction of liquid crystal molecules of its liquid crystal layer. This position is used as a standard. When a voltage is applied thereto, the liquid crystal molecules come to have a predetermined angle to the polarizing axis; thus, polarized light penetrating through one polarizing plate transmitted through the other polarizing plate so that a bright state is generated. In this voltage-applying state, the liquid crystal display is rotated so as to be turned into a dark state. The angle at which the liquid crystal display is rotated at this time is measured. The angle at which the liquid crystal display is rotated is the angle at which the molecular direction of the ferroelectric liquid crystal is changed parallel to the first alignment treatment substrate surface.

As described above, when a negative voltage is applied to the second electrode layer, the liquid crystal molecule is inclined from the mono-stability state thereof to one side on the cone at an angle corresponding to the applied voltage. Thus, in the case that the liquid crystal display is actually driven, it cannot be said that the direction of the liquid crystal molecule F is changed by about 2 times the tilt angle when a negative voltage is applied to the second electrode layer.

As such a ferroelectric liquid crystal, specifically, the following is used: a ferroelectric liquid crystal having a half-V shaped switching (referred to as "HV-shaped switching" herein after) characteristics, in which the liquid crystal molecules operate only when either one of positive and negative voltages, as illustrated in FIGS. 13A and 13B, is applied thereto. Since a ferroelectric liquid crystal showing the HV-shaped switching is used, the opening time as a black and white shutter can be provided for a sufficiently long time. Thereby, each color to be switched by time can be displayed further brightly so that a bright color liquid crystal display can be realized.

The "HV-shaped switching characteristics" mean electro-optic characteristics of exhibiting an asymmetric light transmission in response to applied voltage.

The phase sequence of the ferroelectric liquid crystal is not particularly limited as long as a chiral smectic phase (SmC*) is expressed. Examples thereof include: a phase sequence where a phase change of nematic phase (N)-cholesteric phase (Ch)-chiral smectic C phase (SmC*) advances in temperature lowering process; a phase sequence where a phase change of nematic phase (N)-chiral smectic C phase (SmC*) advances in a temperature lowering process; a phase sequence where a phase change of nematic phase (N)-smectic A phase (Sma)-chiral smectic C phase (SmC*) advances in temperature lowering process; and a phase sequence where a phase change of nematic phase (N)-cholesteric phase (CH)-smectic A phase (Sma)-chiral smectic C phase (SmC*) advances in temperature lowering process.

In general, the ferroelectric liquid crystal having the phase sequence passing through Sma phase has the layer interval of the smectic layer shorten in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface, and thus it is problematic. Generally, in a ferroelectric liquid crystal having a phase sequence which does not pass through Sma phase, two domains (double domains) in which their layer normal lines are different from each other are easily generated. In the present invention, the alignment of a ferroelectric liquid crystal can be made into a mono-stability state without generating such alignment defects. Since the oblique vapor deposition-alignment layer is used in the invention, alignment defects such as zigzag defect or the hairpin defect can be especially restrained.

Such a ferroelectric liquid crystal can be variously selected from generally-known liquid crystal materials in accordance with the required properties.

The liquid crystal material which expresses a SmC* phase from a Ch phase without passing through SmA phase is particularly suitable as a material exhibiting HV-shaped switching characteristics. A specific example thereof is "R2301" manufactured by AZ Electronic Materials.

The liquid crystal material with a phase sequence of passing through a SmA phase is preferably a liquid crystal material which expresses a SmC* phase from a Ch phase by passing through a SmA phase since the material can be selected from wide range. In this case, as such a ferroelectric liquid crystal, although a single material expressing the SmC* phase can be used, a material expressing the above-mentioned phase sequence by adding a small amount of a optically active substance not expressing the SmC phase itself but capable of inducing the large spontaneous polarization and an appropriate spiral pitch to a low viscosity non-chiral liquid crystal easily expressing the SmC phase (herein after, it may be referred to as the host liquid crystal) is preferable. This is because it has low viscosity and capable of realizing a faster response.

As the host liquid crystal mentioned above, a material expressing the SmC phase in a wide temperature range is preferable. Those commonly known as a host liquid crystal for a ferroelectric liquid crystal can be used without limitation particularly. For example, a compound represented by the below-mentioned general formula:

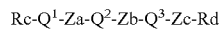

Ra-$Q^1$-$X^1$-($Q^2$-$Y^1$)$_m$-$Q^3$-Rb (in the formula, Ra and Rb are each a straight chain or branched alkyl group, an alkoxy group, an alkoxy carbonyl group, an alkanoyloxy group or an alkoxy carbonyloxy group; $Q^1$, $Q^2$ and $Q^3$ are each a 1,4-phenylene group, a 1,4-cyclohexylene group, a pyridine-2,5-diyl group, a pyradine-2,5-diyl group, a pyridazine-3,6-diyl group or a 1,3-dioxane-2,5-diyl group, in which these groups may have a substituent group such as a halogen atom, a hydroxyl group and a cyano group; $X^1$ and $Y^1$ are each —COO—, —OCO—, —CH$_2$O—, —OCH$_2$—, —CH$_2$CH$_2$—, —C≡C— or a single bond; and m is 0 or 1) can be used. As the host liquid crystal, the above-mentioned compounds can be used either alone by one kind or as a combination of two or more kinds.

The optically active substance to be added to the above-mentioned host liquid crystal is not particularly limited as long as it is a material having the large spontaneous polarization and the ability capable of inducing an appropriate spiral pitch. Those commonly known as a material to be added to a liquid crystal composition expressing the SmC phase can be used. In particular, a material capable of inducing the large spontaneous polarization by a small addition amount is preferable. As such an optically active substance, for example, a compound represented by the below-mentioned general formula:

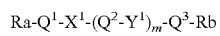

Rc-$Q^1$-Za-$Q^2$-Zb-$Q^3$-Zc-Rd (in the formula, each $Q^1$, $Q^2$, $Q^3$ denotes the same things as in the above-mentioned general formula; Za, Zb and Zc are each —COO—, —OCO—, —CH$_2$O—, —OCH$_2$—, —CH$_2$CH$_2$—, —C≡C—, —CH=N—, —N=N—, —N(→O)=N—, —C(=O)S— or a single bond; Rc is a straight chain or branched alkyl group, which may have an asymmetric carbon atom, an alkoxy group, an alkoxy carbonyl group, an alkanoyloxy group or an alkoxy carbonyloxy group; Rd is a straight chain or branched alkyl group having an asymmetric carbon atom, an alkoxy group, an alkoxy carbonyl group, an alkanoyloxy group or an alkoxy carbonyloxy group, and Rc and Rd each may be substituted with a halogen atom, a cyano group or a hydroxyl group) can be used. As the optically active substance, the above-mentioned compounds can be used either alone by one kind or as a combination of two or more kinds.

As the ferroelectric liquid crystal by way of the SmA phase, specifically, "FELIXM4851-100" manufactured by AZ Electronic Materials, or the like can be presented.

In the liquid crystal display using a ferroelectric liquid crystal exhibiting mono-stability, the transmission thereof depends on the inclination angle of the liquid crystal molecules when a voltage is applied thereto. When either one of positive and negative voltages is applied thereto, the liquid crystal molecule is inclined on the cone. As illustrated in, for example, FIGS. 13A and 13B, therefore, the inclination angle of the liquid crystal molecules is changed in accordance with the applied voltage, so that the transmission is changed. In this case, the transmission becomes maximum when the inclination angle of the liquid crystal molecules is 45° from the mono-stability state.

Accordingly, in order to realize a high transmission, it is preferred to use a ferroelectric liquid crystal in which the inclination angle of liquid crystal molecule becomes 45° from the mono-stability state in the case that a negative voltage is applied to the second electrode layer when the liquid crystal display is actually driven.

In the case of using, for example, a ferroelectric liquid crystal in which the maximum inclination angle δ of liquid crystal molecule from the mono-stability state thereof is larger than 45° as illustrated in FIGS. 12A to 12C, the inclination angle of the liquid crystal molecule from the mono-stability state can be set to 45° when a negative voltage is applied to the second electrode layer during actual driving of the liquid crystal display for the following reason: as described above, it cannot be said that when a negative voltage is applied to the second electrode layer during the actual driving, the direction of the liquid crystal molecule is changed by about 2 times the tilt angle.

In the present embodiment, a liquid crystal layer is constituted by holding the ferroelectric liquid crystal between the oblique vapor deposition-alignment layer and the fixed liquid crystal layer.

Other than the ferroelectric liquid crystal mentioned above, a compound or compounds which has an optional function according to the various functions required for the liquid crystal display may be contained in the liquid crystal layer. As an example of such a compound, a polymerized product of a polymerizable monomer can be cited. By containing such polymerized product of a polymerizable monomer in the liquid crystal layer, alignment of the liquid crystal material is so-called "polymer stabilized" and a liquid crystal display excellent in alignment stability can be obtained.

The polymerizable monomer used in the polymerized product of the polymerizable monomer is not particularly limited as long as it is a compound generating a polymerized product by the polymerization reaction. As such a polymerizable monomer, a thermosetting resin monomer to generate the polymerization reaction by a heat treatment, and an active radiation curable resin monomer to generate the polymerization reaction by the irradiation of an active radiation can be presented. Among them, it is preferable to use an active radiation curable resin monomer. Since the thermosetting resin monomer requires the heat treatment for generating the polymerization reaction, the regular sequence of the ferroelectric liquid crystal may be deteriorated or the phase transition may be induced by such a heat treatment. On the other hand, according to the active radiation curable resin monomer, such risk can be eliminated so that the ferroelectric liquid crystal sequence can hardly be deteriorated by the generation of the polymerization reaction.

As the active radiation curable resin monomer, an electron beam curable resin monomer to generate the polymerization reaction by the irradiation of an electron beam, and a photo setting resin monomer to generate the polymerization reaction by the light irradiation can be presented. Among them, it is preferable to use a photo setting resin monomer because manufacturing process of a liquid crystal display can be simplified by using the photo setting resin monomer.

The photo setting resin monomer is not particularly limited as long as it generates the polymerization reaction by the irradiation of a light beam having a wavelength in a range of 150 nm to 500 nm. In particular, it is preferable to use an ultra violet curable resin monomer to generate the polymerization reaction by the irradiation of a light beam having a wavelength in a range of 250 nm to 450 nm, in particular, in a range of 300 nm to 400 nm because it is advantageous in terms of the convenience in the irradiating device, or the like.

The polymerizable functional group of the ultra violet curable resin monomer is not particularly limited as long as it generates the polymerization reaction by the irradiation of an ultra violet ray of the above-mentioned wavelength range. In particular, it is preferable to use an ultra violet curable resin monomer having an acrylate group.

The ultraviolet curable resin monomer may be a monofunctional monomer having one polymerizable functional group in one molecule, or a polyfunctional monomer having two or more polymerizable functional groups in one molecule. In particular, it is preferable to use a polyfunctional monomer. By using a polyfunctional monomer, a stronger polymer network can be formed and the intermolecular force and the polymer network at the photo alignment layer interface can be reinforced. Thereby, disturbance in the sequence of the ferroelectric liquid crystal by the temperature change of the liquid crystal layer can be restrained.

Among the polyfunctional monomer, it is preferable to use a bifunctional monomer having a polymerizable functional group on the both ends of the molecule. Since the polymerizable functional group is provided on the both ends of the molecule, a polymer network can be formed with a wide interval between the polymers so that decline of the driving voltage of the ferroelectric liquid crystal by the inclusion of a polymerized product of a polymerizable monomer in the liquid crystal layer can be prevented.

Among the ultra violet curable resin monomer, it is preferable to use an ultra violet curable liquid crystal monomer to realize the liquid crystal property. The reason why such an ultra violet curable liquid crystal monomer is preferable is as follows. That is, since the ultra violet curable liquid crystal monomer shows the liquid crystal property, it can be arranged regularly by the alignment limiting force of the photo alignment layer. Therefore, by generating the polymerization reaction after regularly arranging the ultra violet curable liquid crystal monomer, it can be fixed while maintaining the regular sequence state in the liquid crystal layer. Since a polymerized product having such a regular sequence state is present in the liquid crystal layer, the alignment stability of the ferroelectric liquid crystal can be improved so that the liquid crystal display excellent in heat resistance and impact resistance can be obtained.

The liquid crystal phase of the ultra violet curable liquid crystal monomer is not particularly limited, and for example, the nematic phase, the Sma phase, and the SmC phase can be presented.

As the ultra violet curable liquid crystal monomer used in the present embodiment, for example, the compounds represented by a below formulae (1) to (3) can be presented.

[Chemical Formula 1]

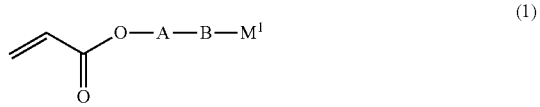

(1)

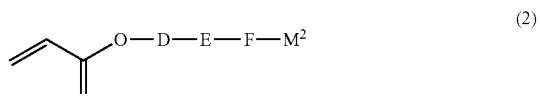

(2)

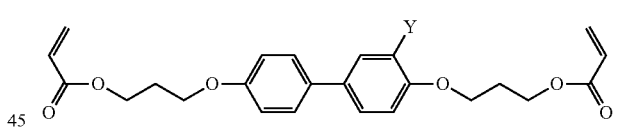

(3)

In the above-mentioned formulae (1) and (2), A, B, D, E and F are benzene, cyclohexane or pyrimidine, which may have a substituent group such as halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a bonding group such as an alkylene group having 3 to 6 carbon atoms.

In the formula (3), Y is hydrogen, alkyl having 1 to 20 carbon atoms, alkenyl having 1 to 20 carbon atoms, alkyloxy having to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro.

Out of the compounds represented by the above-mentioned formulae, the compounds of below-mentioned formulae can be presented as the specific compounds to be used preferably.

[Chemical Formula 2]

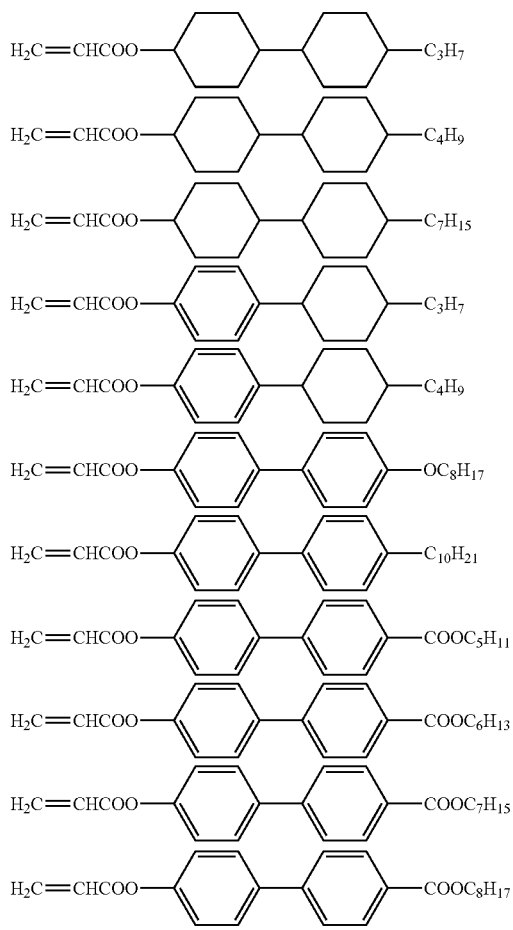

[Chemical Formula 3]

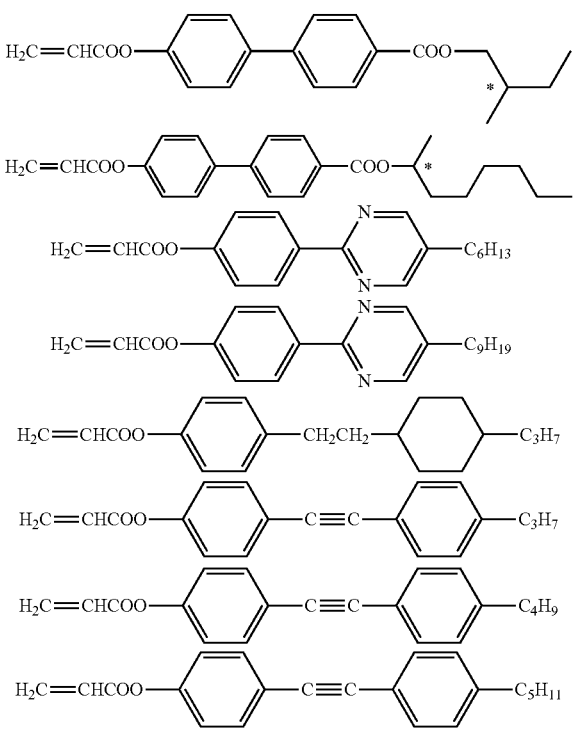

[Chemical Formula 4]

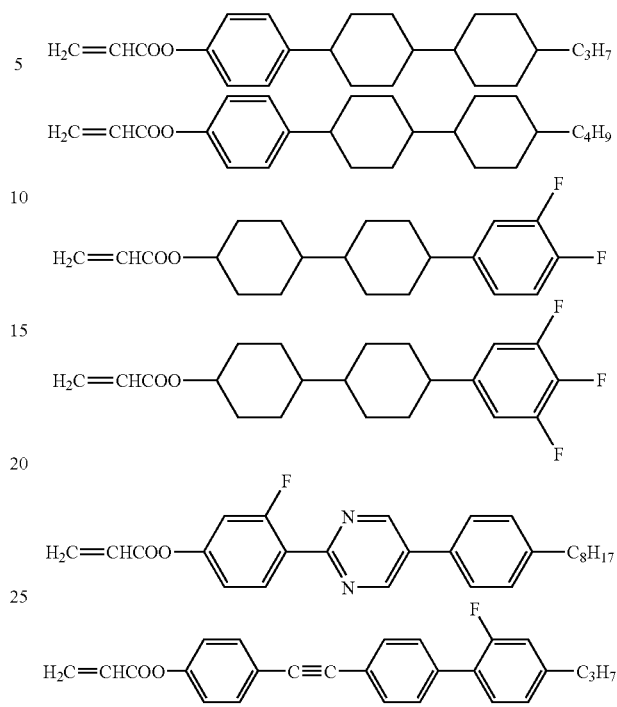

The polymerizable monomer used may be a single polymerizable monomer, or a combination of two or more different polymerizable monomers. In the case of using two or more different polymerizable monomers, for example, an ultra violet curable liquid crystal monomer shown in the above-mentioned formulae and another ultra violet curable resin monomer can be used.

In the case the ultra violet curable liquid crystal monomer is used as the polymerizable monomer, the polymerized product of the polymerizable monomer used may be a main chain liquid crystalline polymerized product with the main chain showing the liquid crystalline property for an atomic group showing the liquid crystalline property provided in the main chain, or a side chain liquid crystalline polymerized product with the side chain showing the liquid crystalline property for an atomic group showing the liquid crystalline property provided in the side chain. Among them, a side chain-liquid crystalline polymerized product is preferable. Since an atomic group showing the liquid crystalline property is present in the side chain, the freedom of the atomic group becomes high so that the atomic group showing the liquid crystalline property can be aligned easily. Moreover, as a result, the alignment stability of the ferroelectric liquid crystal can be improved.

The presence amount of the polymerized product of the polymerizable monomer in the liquid crystal layer is not particularly limited as long as it is in a range capable of providing the sequence stability of the ferroelectric liquid crystal to a desirable degree. In general, it is preferably in a range of 0.5% by mass to 30% by mass in the liquid crystal layer, more preferably in a range of 1% by mass to 20% by mass, and particularly preferably in a range of 1% by mass to 10% by mass. In the case it is more than the above-mentioned range, increase in the driving voltage of the ferroelectric liquid crystal and the decline in the response speed may be generated. Moreover, in the case it is less than the above-mentioned range, due to the insufficiency of the sequence stability in the ferroelectric liquid crystal, the heat resistance and the impact resistance of the liquid crystal display may be deteriorated.

Here, the presence amount of the polymerized product of the polymerizable monomer in the liquid crystal layer can be calculated from the residual amount provided by measuring the weight of the residual polymerized product of the polymerizable monomer with an electron scale after washing the monomolecular liquid crystal in the liquid crystal layer with a solvent, and the total mass of the above-mentioned liquid crystal layer.

In the invention, since the ferroelectric liquid crystal exhibits mono-stability, the liquid crystal can be driven by an active matrix system using thin film transistors (TFT) and gray scale control can be attained by voltage modulation.

The thickness of the liquid crystal layer is preferably from 1.2 μm to 3.0 μm, more preferably from 1.3 μm to 2.5 μm, even more preferably from 1.4 μm to 2.0 μm. If the thickness of the liquid crystal layer is too small, the contrast may lower. Conversely, if the thickness is too large, the liquid crystal may not be aligned with ease. The thickness of the liquid crystal layer can be adjusted by a membrane such as a bead spacer, columnar spacer, or a partition wall.

As the method for forming such liquid crystal layer, a method which is generally used as a method for forming a liquid crystal cell can be used. For example, a vacuum injection method or a One Drop Fill method can be used.

In the vacuum injection method, the liquid crystal layer can be formed, by making use of capillary effect to inject an isotropic liquid obtained by heating the ferroelectric liquid crystal into a liquid crystal cell, which is formed by forming the first alignment treatment substrate and the second alignment treatment substrate beforehand, and then sealing the cell with an adhesive agent.

In the One Drop Fill method, for example, a liquid crystal layer can be formed by: dropping the heated ferroelectric liquid crystal on the fixed liquid crystal layer of the second alignment treatment substrate, coating a sealing agent in the circumferential part of the first alignment treatment substrate, superimposing the first alignment treatment substrate and the second alignment treatment substrate under a reduced pressure, and adhering them with the sealing agent.

2. Second Alignment Treatment Substrate

Next, the second alignment treatment substrate used in the present embodiment is described. The second alignment treatment substrate in the present embodiment is an alignment treatment substrate having a second substrate, a second electrode layer formed on the second substrate, an alignment layer for reactive liquid crystal formed on the second electrode layer, and a fixed liquid crystal layer formed on the alignment layer for reactive liquid crystal. Each of the constituents of the second alignment treatment substrate will be described herein after.

(1) Fixed Liquid Crystal Layer

The fixed liquid crystal layer to be used in this embodiment is formed on the alignment layer for reactive liquid crystal and by fixing a reactive liquid crystal.

Here, the term "reactive liquid crystal" means a liquid crystal before the alignment state of the liquid crystal is fixed. For example, when the liquid crystal is to be polymerized, it means a polymerizable liquid crystal before the alignment state of the liquid crystal is fixed.

The term "fixed liquid crystal layer" means the layer made of the fixed liquid crystal obtained after the alignment state of the liquid crystal is fixed. For example, when the liquid crystal is to be polymerized, it means the layer made of the polymerized liquid crystal.

As reactive liquid crystal used in the present embodiment, it is preferable that the reactive liquid crystal expresses a nematic phase. This is because the nematic phase can allow the alignment control relatively easily among the liquid crystal phases.

It is further preferable that the reactive liquid crystal has a polymerizable liquid crystal material. Accordingly, the aligned state of the reactive liquid crystal can be fixed. As the polymerizable liquid crystal material, any of a polymerizable liquid crystal monomer, a polymerizable liquid crystal oligomer and a polymerizable liquid crystal polymer can be used. In the present invention, the polymerizable liquid crystal monomer can be used preferably. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

The above-mentioned polymerizable liquid crystal monomer is not particularly limited as long as it is a liquid crystal monomer having a polymerizable functional group. For example, a monoacrylate monomer, a diacrylate monomer, or the like can be presented. Moreover, these polymerizable liquid crystal monomers may be used alone or as a mixture of two or more kinds.

As the monoacrylate monomer, for example, the compounds represented by the below-mentioned formulae (1) and (2) can be presented:

[Chemical Formula 5]

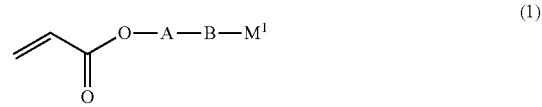

(1)

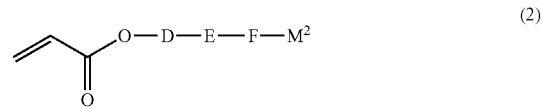

(2)

In the formulae (1) and (2), A, B, D, E and F are benzene, cyclohexane or pyrimidine, which may have a substituent group such as halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

Furthermore, as the diacrylate monomer, for example, the compounds represented by the below-mentioned formula (4) can also be presented:

[Chemical Formula 6]

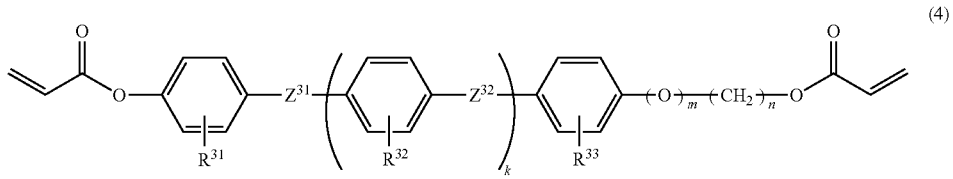

In the formula (4), $Z^{31}$ and $Z^{32}$ are each independently and directly bonded —COO—, —OCO—, —O—, —CH$_2$CH$_2$—, —CH═CH—, —C≡C—, —OCH$_2$-1—CH$_2$O—, —CH$_2$CH$_2$COO— or —OCOCH$_2$CH$_2$—; $R^{31}$, $R^{32}$ and $R^{33}$ are each independently a hydrogen or an alkyl having 1 to 5 carbon atoms; k and m is each 0 or 1; and n is an integer in a range of 2 to 8. When K=1, $R^{31}$, $R^{32}$ and $R^{33}$ are each independently alkyl having 1 to 5 carbon atoms. When K=0, they are each independently hydrogen or alkyl having 1 to 5 carbon atoms. Further, $R^{31}$, $R^{32}$ and $R^{33}$ may be the same to each other.

As a specific example of the formula (4), a compound represented by the below formula (5) can be cited.

[Chemical Formula 7]

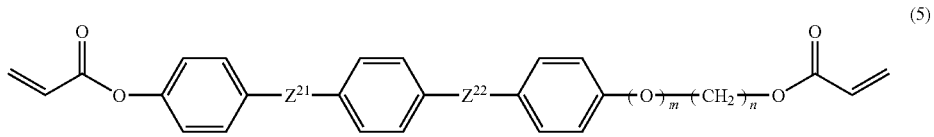

In the (5), $Z^{21}$ and $Z^{22}$ are each independently and directly bonded —COO—, —OCO—, —O—, —CH$_2$CH$_2$—, —CH═CH—, —C≡C—, —OCH$_2$—, —CH$_2$O—, —CH$_2$CH$_2$COO— or —OCOCH$_2$CH$_2$—; m is 0 or 1; and n is an integer in a range of 2 to 8.

Moreover, as the diacrylate monomer, for example, the compounds represented by the below-mentioned formulae (6) and (7) can be presented:

[Chemical Formula 8]

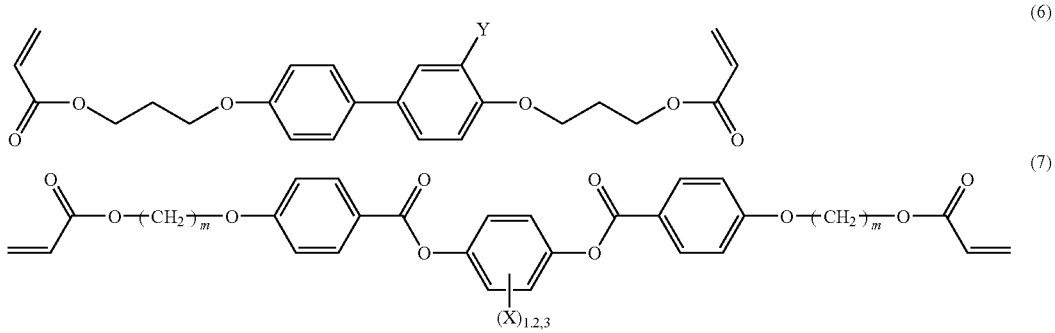

In the formulae (6) and (7), X and Y each is hydrogen, alkyl having 1 to 20 carbon atoms, alkenyl having 1 to 20 carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro; and m is an integer in a range of 2 to 20. Moreover, in the formula (7), X is preferably alkyloxy carbonyl having 1 to 20 carbon atoms, methyl or chlorine. Among them, it is preferably alkyloxy carbonyl having 1 to 20 carbon atoms, and particularly preferably $CH_3(CH_2)_4OCO$.

In the present embodiment, among the above compounds represented by the formulae (4) and (7) are preferably used, and the compound represented by the formula (4) is particularly suitable. As the specific examples, ADEKA CHIRACOL PLC-7183, ADEKACHIRACOL PCL-7209 and ADEKACHIRACOL PLC-7218 manufactured by ASAHI DENKA Co., Ltd., or the like can be presented.

The polymerizable liquid crystal monomer used in the present embodiment is preferably a diacrylate monomer among the above-mentioned examples. This is because the diacrylate monomer can carry out polymerization easily while preferably maintaining the aligned state.

The above-mentioned polymerizable liquid crystal monomer may not express the nematic phase by itself. These polymerizable liquid crystal monomers may be used as a mixture of two or more kinds as mentioned above so that a composition mixture thereof, that is, a reactive liquid crystal may express the nematic phase.

Furthermore, in the present embodiment, as needed, a photo polymerization initiating agent or a polymerization inhibiting agent may be added to the above-mentioned reactive liquid crystal. For example, at the time of polymerizing a polymerizable liquid crystal material by the electron beam irradiation, the photo polymerization initiating agent may not be needed, however, in the case of the polymerization used commonly by for example, the ultra violet ray irradiation, a photo polymerization initiating agent is generally used for promoting the polymerization. As the photo polymerization initiating agent, those disclosed in Japanese Patent Application publication No. 2005-258428 can be used. Further, a sensitizer can be added other than the photo polymerization initiating agent to the extent not to deteriorate the object of the present invention.

The addition amount of such a photo polymerization initiating agent is in general 0.01 to 20% by weight, it is preferably 0.1 to 10% by weight, and more preferably in a range of 0.5 to 5% by weight so as to be added to the above-mentioned reactive liquid crystal.

The thickness of the fixed liquid crystal layer may be determined based on the needed anisotropy. For example, the thickness of the reactive liquid crystal layer can be set in a range of 1 nm to 1,000 nm, and it is more preferably in a range of 3 nm to 100 nm. In the case the fixed liquid crystal layer is thicker than the above-mentioned range, the anisotropy is generated excessively, and in the case it is thinner than the above-mentioned range, the predetermined anisotropy may not be obtained.

Next, the method for forming the fixed liquid crystal layer will be explained. The fixed liquid crystal layer can be formed by coating a fixed liquid crystal layer coating solution including the above-mentioned reactive liquid crystal onto the alignment layer for reactive liquid crystal and applying the alignment treatment so as to fix the aligned state of the above-mentioned reactive liquid crystal.

Moreover, a method of preliminarily forming a dry film, or the like and laminating the same onto the alignment layer for reactive liquid crystal can also be used instead of coating the fixed liquid crystal layer coating solution. It is preferable to use the method of preparing a fixed liquid crystal layer solution by dissolving a reactive liquid crystal in a solvent, coating the same on the alignment layer for reactive liquid crystal and removing the solvent because of the simplicity in the manufacturing process.

The solvent used for the above-mentioned fixed liquid crystal layer coating solution is not particularly limited as long as it can dissolve the above-mentioned reactive liquid crystal, or the like without inhibiting the alignment ability of the alignment layer for reactive liquid crystal. As such solvent, those disclosed in Japanese Patent Application Publication No. 2005-258428 can be used. The solvent may be used alone or in mix of two or more.

Moreover, by using only one kind of a solvent, the solubility of the above-mentioned reactive liquid crystal, or the like may be insufficient or the alignment layer for reactive liquid crystal may be corroded as mentioned above. By using two or more kinds of the solvents as a mixture, the trouble can be avoided. Among the above-mentioned solvents, those preferable as a single solvent are the hydrocarbons and the glycol monoether acetate based solvents, and those preferable as a solvent mixture are a mixture of the ethers or the ketones and the glycol based solvents.

Since the concentration of the fixed liquid crystal layer coating solution depends on the solubility of the reactive liquid crystal and the thickness of the fixed liquid crystal layer to be formed, it cannot be defined on the whole, however, it is prepared in general in a range of 0.1 to 40% by weight, and preferably in a range of 1 to 20% by weight. In the case the concentration of the fixed liquid crystal layer coating solution is lower than the above-mentioned range, the reactive liquid crystals may hardly be aligned. On the other hand, in the case the concentration of the fixed liquid crystal layer coating solution is higher than the above-mentioned range, the viscosity of the fixed liquid crystal layer coating solution becomes higher so that an even coating film may hardly be formed.

Furthermore, to the above-mentioned fixed liquid crystal layer coating solution, the compounds as disclosed in Japanese Patent Application Publication No. 2005-258428 can be added within a range of not deteriorating the purpose of the present invention. The addition amount of these compounds to the above-mentioned reactive liquid crystal can be selected within a range of not deteriorating the purpose of the present invention. By adding these compounds, the hardening properties of the reactive liquid crystal can be improved so that the mechanical strength of the fixed liquid crystal layer to be obtained can be increased and furthermore, the stability thereof can be improved.

AS a method for coating such a fixed liquid crystal layer coating solution, a spin coating method, a roll coating method, a printing method, a dip coating method, a die coating method, a casting method, a bar coating method, a blade coating method, a spray coating method, a gravure coating method, a reverse coating method, an extruding coating method, an ink jet method, a flexo printing method, a screen printing, or the like can be presented.

Moreover, after coating the above-mentioned fixed liquid crystal layer coating solution, the solvent is removed, and the solvent removal can be carried out by the reduced pressure removal or the heating removal; furthermore, a method as a combination thereof, or the like.

According to the present embodiment, as mentioned above, the coated reactive liquid crystal is aligned by the alignment layer for reactive liquid crystal so as to be in a state having the liquid crystal regularity. That is, the reactive liquid crystal comes to have the nematic phase. This is carried out in general by a method of the heat treatment to the N—I transition point or lower, or the like. Here, the "N—I transition point" denotes the temperature of the transition from the liquid crystal phase to the isotropic phase.

As mentioned above, the reactive liquid crystal has a polymerizable liquid crystal material. In order to fix the aligned state of such a polymerizable liquid crystal material, a method of directing an activating radiation for activating the polymerization is used. The "activating radiation" here is the radiation having the ability of inducing the polymerization to the polymerizable liquid crystal material. As needed, a photo polymerization initiating agent may be included in the polymerizable liquid crystal material.

The activating radiation is not particularly limited as long as it is a radiation capable of polymerizing the polymerizable liquid crystal material. In general, from the viewpoint of the device easiness, or the like, an ultra violet ray or a visible light beam is used. An irradiation beam having a wavelength of 150 to 500 nm, preferably 250 to 450 nm, further preferably 300 to 400 nm is used.

According to the present embodiment, a method of directing an ultra violet ray as the activating radiation to a polymerizable liquid crystal material to have the radical polymerization by generating a radical by the photopolymerization initiating agent with an ultra violet ray is a preferable method. Since the method of using an ultra violet ray as the activating radiation is a technique already established, it can be applied easily to the present embodiment including the photo polymerization initiating agent to be used.

As the light source of the irradiating light beam, a low pressure mercury lamp (a germicidal lamp, a fluorescent chemical lamp, a black light), a high pressure discharge lamp (a high pressure mercury lamp, a metal halide lamp), a short arc discharge lamp (an ultra high pressure mercury lamp, a xenon lamp, a mercury xenon lamp), or the like can be presented as the examples. In particular, use of a metal halide lamp, a xenon lamp, a high pressure mercury lamp, or the like can be recommended. Moreover, the irradiation strength is adjusted optionally according to the composition of the reactive liquid crystal and the amount of the photo polymerization initiating agent.

The irradiation of such an activating radiation can be carried out by the temperature condition to have the above-mentioned polymerizable liquid crystal material in a liquid crystal phase, or at a temperature lower than the temperature to have the liquid crystal phase. The polymerizable liquid crystal material once had the liquid crystal phase would not have the sudden disturbance of the aligned state even in the case the temperature is lowered thereafter.

As a method for fixing the aligned state of the polymerizable liquid crystal material, in addition to the above-mentioned method of directing the activating radiation, a method of polymerizing the polymerizable liquid crystal material by heating can be used as well. As the reactive liquid crystal used in this case, those having the polymerizable liquid crystal monomers contained in the reactive liquid crystal are thermally polymerized at the N—I transition point or lower of the reactive liquid crystal are preferable.

The fixed liquid crystal layer obtained in this manner acts as an alignment layer that aligns the ferroelectric liquid crystal and has the ability to control alignment as mentioned above.

Because the fixed liquid crystal layer is obtained by aligning a reactive liquid crystal by the alignment layer for reactive liquid crystal and by, for example, irradiating the reactive liquid crystal with ultra violet rays to polymerize the reactive liquid crystal, to thereby fix the alignment state of the reactive liquid crystal, it has a phase difference.

(2) Alignment Layer for Reactive Liquid Crystal

Any alignment layer may be used as the alignment layer for reactive liquid crystal to be used in this embodiment without any particular limitation insofar as it can align the above-mentioned reactive liquid crystal and it has no adverse influence when the alignment state of the reactive liquid crystal is fixed. For example, a rubbed layer which has been processed by rubbing treatment, a photo alignment layer which has been processed by photo alignment treatment, an oblique vapor deposition layer formed by the oblique vapor deposition method, or the like may be used. The alignment layer for reactive liquid crystal is preferably a photo alignment layer or an oblique vapor deposition layer among these layers. Since the photo alignment treatment and oblique vapor deposition method are both non-contact alignment treatments, these methods are useful because they are free from the generation of static electricity and dusts and can control the alignment treatment quantitatively. The oblique vapor deposition layer can attain a relatively higher pre-tilt angle like the oblique vapor deposition-alignment layer. Moreover, in the case of an oblique vapor deposition layer using an inorganic material, there is such a merit that the oblique vapor deposition layer is reduced in the deterioration caused by environmental factors (light, heat and moisture) and stable qualities are easily obtained.

Here, the oblique vapor deposition layer is the same as that described in the paragraph "3. First alignment treatment substrate (1) Oblique vapor deposition-alignment layer" which will be described later and therefore, explanations thereof are omitted here. The photo alignment layer and the rubbed layer will be explained.

(i) Photo Alignment Layer

The photo alignment layer has the liquid crystal molecules on the layer aligned by imparting anisotropy to a layer obtained by directing a light beam with the polarization controlled to a substrate coated with the constituent materials of the photo alignment layer to be described later so as to generate the photo-excitation reaction (decomposition, isomerization, dimerization).

The constituent material for the photo alignment layer used in the present embodiment is not particularly limited as long as it has the effect of aligning the ferroelectric liquid crystal by generating the photo-excitation reaction by directing a light beam (photoaligning). Such materials can be roughly classified into the photoreactive type materials to impart anisotropy to the photo alignment layer by generating the photoreaction and the photo-isomerizable type materials to impart anisotropy to the photo alignment layer by generating the photo-isomerization reaction.

The wavelength range of light which causes photo-excitation reaction in the constituent materials of the photo alignment layers is preferably within the wavelength range of ultra violet rays, that is, the range of 10 to 400 nm, more preferably within the range of 250 to 380 nm.

Hereinafter, each of the photoreactive type material and the photo-isomerization type material will be explained.

(Photoreaction Type)

First, the photoreaction type constituent materials will be explained. As mentioned above, the photoreaction type constituent material is a material to impart anisotropy to the photo alignment layer by generating the photoreaction. The photoreactive type constituent materials used in the present embodiment are not particularly limited as long as they have such properties. Among them, a material to impart anisotropy to the above-mentioned photo alignment layer by generating the photo-dimerization reaction or the photo-decomposition reaction is preferable.

The photo-dimerization reaction is a reaction that two molecules are polymerized by radical polymerization of their reactive sites aligned in the direction of polarization through the light irradiation. This reaction makes it possible to stabilize the alignment in the polarization direction to impart anisotropy to the photo alignment layer. On the other hand, the photo-decomposition reaction is a reaction which decomposes a molecule chain of polyimide or the like which is aligned in the direction of polarization by the light irradiation. This reaction makes it possible to impart anisotropy to the photo alignment layer in the state that the molecule chain aligned in the direction perpendicular to the polarization direction remains. It is more preferable in the invention to use, out of these photoreactive materials, materials which impart anisotropy to the photo alignment layer by the photo-dimerization reaction since the materials are high in exposure sensitivity and the scope of material-selection is wide.

The photoreactive material using the photo-dimerization reaction is not limited to any especial kind if the material can impart anisotropy to the photo alignment layer by photo-dimerization reaction. The material preferably comprises a photo-dimerization-reactive compound having a radically-polymerizable functional group and showing dichroism having different absorptions depending on the polarization direction thereof. This is because the alignment of the photo-dimerization-reactive compound is stabilized and anisotropy can easily be imparted to the photo alignment layer by radically-polymerizing its reactive sites aligned in the polarization direction.

Examples of the photo-dimerization-reactive compound having such properties include dimerization-reactive polymers each having, as its side chain, at least one reactive site selected from cinnamic acid ester, coumarin, quinoline, a chalcone group and a cinnamoyl group.

Of these, the following is preferred as the photo-dimerization-reactive compound having such properties: a dimerization-reactive polymer having, as its side chain, any one of cinnamic acid ester, coumarin and quinoline. This is because the compound is radically-polymerized in the state that the double bonds in the α,β-unsaturated ketone aligned in the polarization direction function as reactive sites, whereby anisotropy can easily be imparted to the photo alignment layer.

The main chain of the dimerization-reactive polymer is not limited to any especial kind if the main chain is a chain that is generally known as a polymer main chain, and is preferably a chain which does not have a substituent containing many n electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be imparted to the photo alignment layer. Conversely, if it is too large, the viscosity of the coating solution at the time of the formation of the photo alignment layer is so high that a homogeneous coat film may not easily be formed.

As the dimerization-reactive polymer, a compound represented by the following formula (8) can be illustrated:

[Chemical Formula 9]

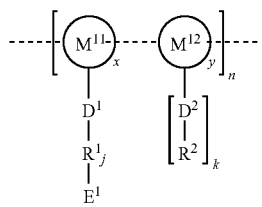

(8)

In the formula (8), $M^{11}$ and $M^{12}$ each independently represent a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^{12}$ may be acrylonitrile, methacrylonitrile, methacrylate, methyl methacrylate, hydroxyalkyl acrylate or hydroxyalkyl methacrylate; x and y each represent the mole ratio of each of the monomer units when the units are polymerized into a copolymer, and are each a number satisfying: $0 \leq x \leq 1$, $0 \leq y \leq 1$, and $x+y=1$; and n represents an integer of 4 to 30,000. $D^1$ and $D^2$ each represent a spacer unit.

$R^1$ is a group represented by $-A^1-(Z^1-B^1)_z-Z^2-$, and $R^2$ is a group represented by $-A^1-(Z^1-B^1)_z-Z^3-$, in which $A^1$ and $B^1$ each independently represent a covalent single bond, pyridine-2,5-diyl, pyrimidine-2,5-diyl, 1,4-cyclohexylene, 1,3-dioxane-2,5-diyl, or 1,4-phenylene which may have a substituent; $Z^1$ and $Z^2$ each independently represent a covalent single bond, $-CH_2-CH_2-$, $-CH_2O-$, $-OCH_2-$, $-CONR-$, $-RNCO-$, $-COO-$ or $-OOC-$, in which R is a hydrogen atom or a lower alkyl group; $Z^3$ is a hydrogen atom, alkyl or alkoxy which has 1 to 12 carbon atoms and may have a substituent, cyano, nitro or halogen; z is an integer of 0 to 4; $E^1$ represents a photo dimerization-reactive site, examples of which include cinnamic acid ester, coumarin, quinoline, a chalcone group and a cinnamoyl group; and j and k are each independently 0 or 1.

As the dimerization-reactive polymer, include compounds represented by the following formulae (9) to (12) can be specifically cited:

[Chemical Formula 10]

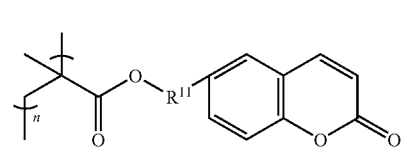

(9)

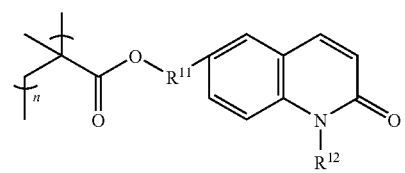

(10)

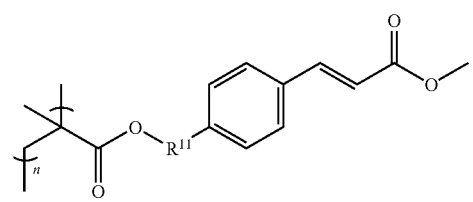

(11)

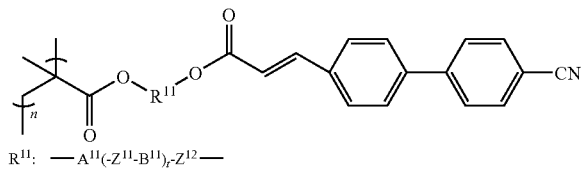

(12)

$R^{11}$: $-A^{11}(-Z^{11}-B^{11})_t-Z^{12}-$ in which $A^{11}$ and $B^{11}$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: $-CH_2-CH_2-$, $-COO-$, $-OOC-$, or a covalent single bond;

t: an integer of 0 to 4;

$R^{12}$: a lower alkyl; and n: an integer of 4 to 30,000.

As the above-mentioned dimerization-reactive polymers, the compounds (13) to (16) represented by the following formulae can be cited as specific examples:

[Chemical Formula 11]

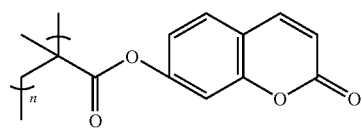

(13)

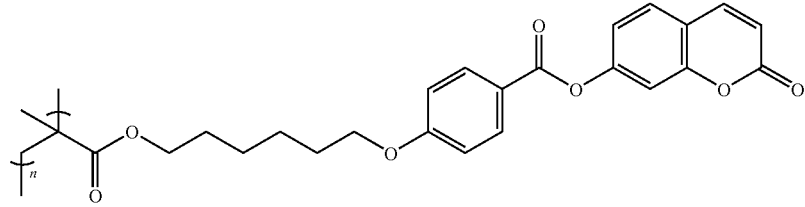

(14)

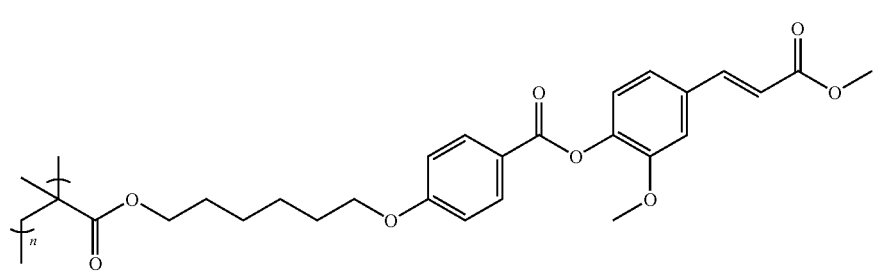

(15)

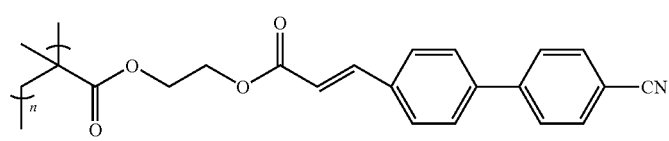

(16)

In the present embodiment, a photo dimerization-reactive site or substituent can be variously selected as the photo-dimerization-reactive compound from the above-mentioned compounds in accordance with required properties. One kind of the photo-dimerization-reactive compound may be used alone or a combination of two or more kinds thereof can be used.

The photoreactive material using photo-dimerization reaction may contain additives besides the above-mentioned photo-dimerization-reactive compound as long as the photo-aligning of the photo alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo-dimerization-reactive compound and then use the selected one. The added amount of the polymerization initiator or the polymerization inhibitor is preferably from 0.001 to 20% by weight, more preferably from 0.1 to 5% by weight of the photo-dimerization-reactive compound. If the added amount of the polymerization initiator or the polymerization inhibitor is too small, the polymerization may not be initiated (or inhibited). Conversely, if the amount is too large, the reaction may be hindered.

As the photoreactive type material utilizing the photo-decomposing reaction, for example, polyimide "RN1199" manufactured by NISSAN CHEMICAL INDUSTRIES, LTD., or the like can be presented.

(Photo-Isomerization Type)

Next, the photo-isomerization type material will be explained. The photo-isomerization type material here is a material to impart anisotropy to the photo alignment layer by generating the photo-isomerization reaction as mentioned above. It is not particularly limited as long as it is a material having such properties. Those including the photo-isomerization-reactive compound to impart anisotropy to the above-mentioned photo alignment layer by generating the photo-isomerization reaction are preferable. Since such a photo-isomerization-reactive compound is included, stable isomers are increased out of a plurality of isomers by the light irradiation, and thereby the anisotropy can be imparted easily to the photo alignment layer.

The photo-isomerization-reactive compound is not limited to any especial kind if the compound is a material having such properties mentioned above, and is preferably a compound which shows a dichroism having different absorptions depending on the polarization direction thereof and generates photo-isomerization reaction by the light irradiation. By generating the isomerization of the reactive site aligned in the polarization direction of the photo-isomerization-reactive compound having such properties, anisotropy can easily be imparted to the photo alignment layer.

For the photo-isomerization reaction generated by the photo-isomerization-reactive compound is preferably the cis-trans isomerization reaction. This is because any one of the cis-isomer and the trans-isomer increases by the light irradiation, whereby anisotropy can be imparted to the photo alignment layer.

Examples of the photo-isomerization-reactive compound used in the invention may be monomolecular compounds or polymerizable monomers polymerizable with light or heat. These should be appropriately selected in accordance with the kind of the used ferroelectric liquid crystal. It is preferable to use any one of the polymerizable monomers since the monomer imparts anisotropy to the photo alignment layer by the light irradiation and subsequently the monomer is polymerized, whereby the anisotropy can be made stable. Of such polymerizable monomers, preferable is an acrylate monomer or a methacrylate monomer since the monomer imparts anisotropy to the photo alignment layer and subsequently the monomer can easily be polymerized in the state that the anisotropy is kept good.

The polymerizable monomer may be a monofunctional monomer or a polyfunctional monomer. A bifunctional monomer is preferable since the anisotropy of the photo alignment layer, based on the polymerization, becomes more stable.

Specific examples of such a photo-isomerization-reactive compound include compounds having a cis-trans isomerization-reactive skeleton, such as an azobenzene skeleton or a stilbene skeleton.

In this case, the number of the cis-trans isomerization-reactive skeleton(s) may be one or more, and is preferably two since the alignment of the ferroelectric liquid crystal is easily controlled.

The cis-trans isomerization-reactive skeleton(s) may have a substituent in order to make interaction thereof with the liquid crystal molecules higher. The substituent is not limited to any especial kind if the substituent can make the interaction with the liquid crystal molecules high and further does not hinder the alignment of the cis-trans isomerization-reactive skeleton(s). Examples thereof include a carboxyl group, a sodium sulfonate group, and a hydroxyl group. These skeleton structures can be appropriately selected in accordance with the kind of the used ferroelectric liquid crystal.

The photo-isomerization-reactive compound may have a group containing many $\pi$ electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high. Examples thereof include —COO—, —OCO—, —O—, —C≡C—, —CH$_2$—CH$_2$—, —CH$_2$O—, and —OCH$_2$—.

In the case of using a polymerizable monomer as the photo-isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy imparted to the photo alignment layer becomes larger and this compound becomes particularly suitable for the control of the alignment of the ferroelectric liquid crystal. In this case, it is preferable that the above-mentioned aromatic hydrocarbon group and the bonding group contained in the molecule are contained, together with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be aligned.

Of the above-mentioned photo-isomerization-reactive compounds of monomolecular compounds and polymerizable monomers, any compound having in the molecule thereof an azobenzene skeleton is preferable as the photo-isomerization-reactive compound used in the present embodiment. This is because the azobenzene skeleton interacts highly with the liquid crystal molecules and is particularly suitable for the control of the alignment of the ferroelectric liquid crystal since the skeleton contains many $\pi$ electrons.

Hereinafter, the reason why the anisotropy can be imparted to the photo alignment layer by generating the photo-isomerization reaction with the azobenzene skeleton will be explained. First, when the azobenzene skeleton is irradiated with linearly polarized ultra violet rays, the azobenzene skeleton of a trans isomer, as shown in the below formula, in which its molecule long axis is aligned in the polarization direction, is changed to the cis isomer thereof.

[Chemical Formula 12]

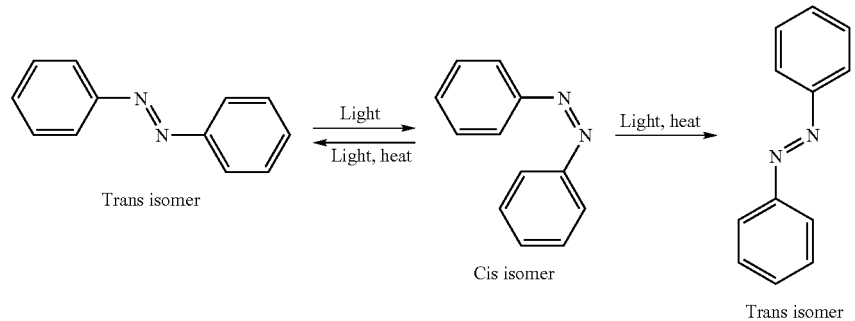

Trans isomer — Light / Light, heat — Cis isomer — Light, heat — Trans isomer

Since the cis isomer of the azobenzene skeleton is more chemically unstable than trans isomers thereof, the cis isomer returns thermally to any one of the trans isomers or absorbs visible rays to returns thereto. At this time, it happens with the same possibility whether the cis isomer turns to the trans isomer at the left side or the trans isomer at the right side in above formula. Accordingly, when the azobenzene skeleton continues to absorb ultra violet rays, the ratio of the trans isomer at the right side increases so that the average alignment direction of the azobenzene skeleton becomes perpendicular to the polarized ultra violet ray direction. In the present invention, this phenomenon is used to make polarization directions of azobenzene skeletons consistent with each other, thereby imparting anisotropy to the photo alignment layer to control the alignment of liquid crystal molecules on the layer.

An example of a monomolecular compound out of the compounds each having in the molecule thereof an azobenzene skeleton may 9 be a compound represented by the following formula (17):

[Chemical Formula 13]

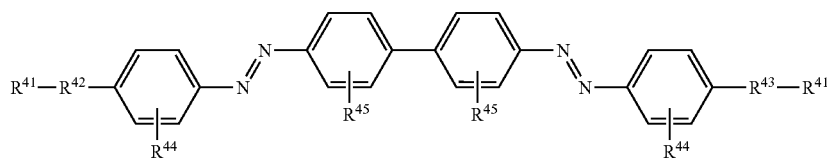

(17)

In the formula (17), each $R^{41}$ independently represent a hydroxy group; $R^{42}$ represents a linking group represented by $-(A^{41}-B^{41}-A^{41})_m-(D^{41})_n$- and $R^{43}$ represents a linking group represented by $(D^{41})_n-(A^{41}-B^{41}-A^{41})_m$-, in which $A^{41}$ represents a bivalent hydrocarbon group, $B^{41}$ represents —O—, —COO—, —OCO—, —CONH—, —NHCO—, —NH-COO— or —OCONH—, m represents an integer of 0 to 3, $D^{41}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{44}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{45}$ independently represents a carboxy group, a sulfo group, a nitro group, an amino group or a hydroxy group provided that the carboxy group or the sulfo group may be combined with an alkali metal to form a salt.

Specific examples of the compound represented by the above-mentioned formula (17) include the following compounds (18) to (21):

[Chemical Formula 14]

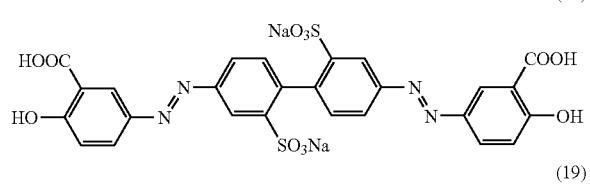

(18)

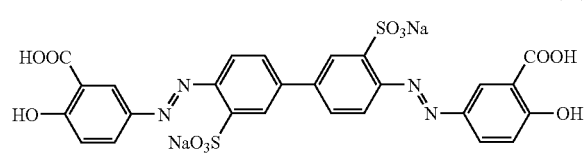

(19)

-continued

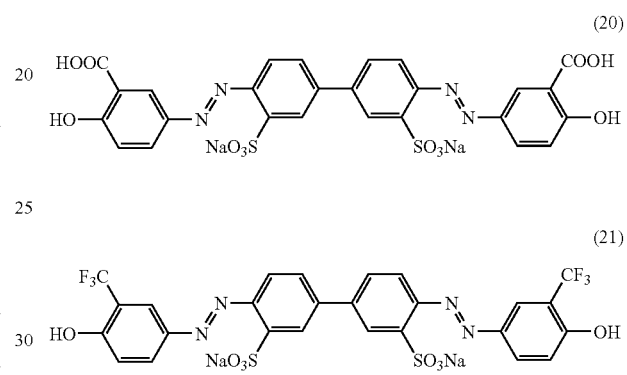

(20)

(21)

Conventionally, although the monomolecular compound having the azobenzene skeleton shown by the above-mentioned formula having a high alignment limiting force with respect to a liquid crystal molecule is useful as a constituent material for a photo alignment layer, it can hardly be used as a material for a photo alignment layer due to the problem of insufficiency in stability. In the present embodiment, since the reactive liquid crystal providing the above-mentioned fixed liquid crystal layer can stabilize the monomolecular compound having an azobenzene skeleton, by laminating the fixed liquid crystal layer on the photo alignment layer, the monomolecular compound having an azobenzene skeleton can be used stably as a constituent material for a photo alignment layer.

An example of the polymerizable monomer having as its side chain the azobenzene skeleton may be a compound represented by the following formula (22):

[Chemical Formula 15]

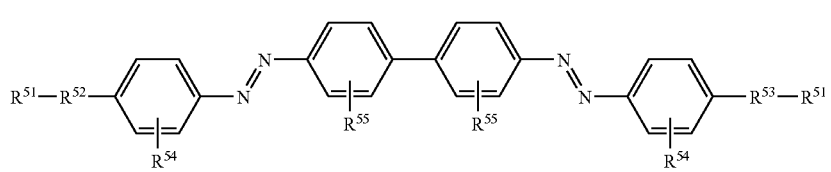

(22)

In the above formula (22), each $R^{51}$ independently represents a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{52}$ represents a linking group represented by -$(A^{51}$-$B^{51}$-$A^{51})_m$-$(D^{51})_n$- and $R^{53}$ represents a linking group represented by $(D^{51})_n$-$(A^{51}$-$B^{51}$-$A^{51})_m$-, in which $A^{51}$ represents a bivalent hydrocarbon group, $B^{51}$ represents —O—, —COO—, —OCO—, —CONH—, —NHCO—, —NHCOO— or —OCONH—, m represents an integer of 0 to 3, $D^{51}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{54}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{55}$ independently represents a carboxy group, a sulfo group, a nitro group, an amino group or a hydroxy group provided that the carboxy group or the sulfo group may be combined with an alkali metal to form a salt.

Specific examples of the compound represented by the above-mentioned formula (22) are the following compounds (23) to (26):

In the present embodiment, the cis-trans isomerization-reactive skeleton or substituent can be variously selected from the above-mentioned photo-isomerization-reactive compounds in accordance with required properties. One kind of the photo-isomerization-reactive compound may be used alone or a combination of two or more kinds thereof can be used.

Additives, besides the photo-isomerization-reactive compound of the present embodiment, may be contained as the photo-isomerization type used in the present embodiment as long as the photoaligning of the photo alignment layer is not hindered. In the case of using a polymerizable monomer as the photo-isomerization-reactive compound, examples of the additives include a polymerization initiator and a polymerization inhibitor.

It is advisable to select the polymerization initiator or the polymerization inhibitor appropriately from generally-known compounds in accordance with the kind of the photo-isomerization-reactive compound and then use the selected one. The added amount of the polymerization initiator or the polymerization inhibitor is preferably from 0.001 to 20%, more preferably from 0.1 to 5% by weight of the photo-isomerization-reactive compound. If the added amount of the polymerization initiator or the polymerization inhibitor is too small, the polymerization may not be initiated (or inhibited). Conversely, if the amount is too large, the reaction may be hindered.

[Chemical Formula 16]

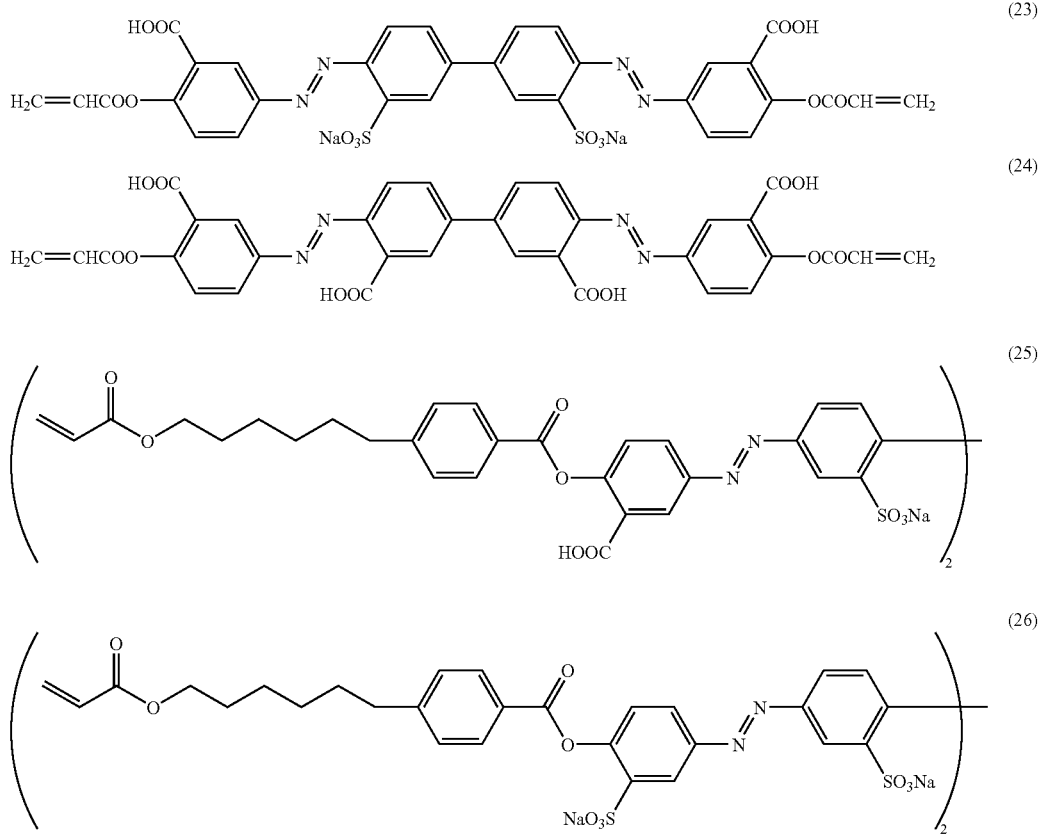

(Photo Alignment Treatment Method)

Next, the photo alignment treatment method will be explained. First, a coating solution prepared by diluting the constituent materials of the above-mentioned photo alignment layer with an organic solvent is coated onto the surface facing the liquid crystal layer of the second substrate provided with the second electrode layer, and dried. In this case, the content of the photo-dimerization-reactive compound or the photo-isomerization-reactive compound in the coating solution is preferably in a range of 0.05 to 10% by weight, and it is more preferably in a range of 0.2 to 2% by weight. In the case the content is fewer than the range, it is difficult to impart the appropriate anisotropy to the alignment layer. On the contrary, if the content is more than the range, a homogeneous coating layer can hardly be formed due to the high viscosity of the coating solution.

The coating method which can be used is a spin coating, a roll coating, a rod bar coating, a spray coating, an air knife coating, a slot die coating, a wire bar coating, an inkjet coating, a flexo-printing method, a screen printing method or the like.

The thickness of the layer obtained by the coating the constituent material is preferably from 1 nm to 1000 nm, more preferably from 3 nm to 100 nm. If the thickness of the layer is thinner than the range, a sufficient photoaligning may not be obtained. Conversely, if the thickness is thicker than the range, resulting costs may not be preferred.

The resultant layer causes photo-excitation reaction by the light irradiation the polarization of which is controlled, whereby anisotropy can be imparted. The wavelength range of the radiated light should be appropriately selected in accordance with the constituent material of the used photo alignment layer, and is preferably the range of ultra violet ray wavelengths, that is, the range of 100 nm to 400 nm, more preferably the range of 250 nm to 380 nm. The polarizing direction is not particularly limited as long as it can generate the photo-excitation reaction.

Furthermore, in the case of using, as the constituent material of the photo alignment layer, a polymerizable monomer out of the above-mentioned photo-isomerization type reactive compounds, the anisotropy imparted to the photo alignment layer can be stabilized by subjecting the monomer to photo alignment treatment, and then polymerizing the monomer by heating the monomer.

(ii) Rubbed Layer

Any material may be used as the material for the rubbed layer without any particular limitation insofar as it can impart anisotropy to the layer by rubbing treatment. Examples of the material may include polyimide, polyamide, polyamideimide, polyether imide, polyvinyl alcohol and polyurethane. These compounds may be used either alone or in combinations of two or more.

As the rubbing treatment, a method of imparting anisotropy to the alignment layer by coating the above-mentioned material to the layer to cure, and by rubbing the obtained layer in a fixed direction with a rubbing cloth can be used.

As the method of coating the above-mentioned material, a roll coating method, a rod bar coating method, a slot die coating method, a wire bar coating method, an ink jet method, a flexo-printing method, a screen printing method or the like may be used.

The thickness of the rubbed layer is designed to be about 1 nm to 1000 nm and preferably in a range from 50 nm to 100 nm.

As the rubbing cloth, for example, those made of a fiber of a nylon resin, a vinyl resin, rayon or cotton may be used. For example, a drum around which such a rubbing cloth is wound is brought into contact with the surface of the layer using the above-mentioned material while rotating the drum to thereby form fine channels in one direction on the surface of the layer, with the result that anisotropy is imparted to the alignment layer.

(3) Second Substrate

The second substrate used in the present embodiment is not particularly limited as long as it is generally used as a substrate for a liquid crystal display. For example, a glass plate and a plastic plate can be presented preferably.

(4) Second Electrode Layer

The second electrode layer used in the present embodiment is not particularly limited as long as it is generally used as an electrode for a liquid crystal display. At least one of the electrode layers of the first and second alignment treatment substrates is preferably a transparent conductor. Preferred examples of the material of the transparent conductor include such as indium oxide, tin oxide, and indium tin oxide (ITO). In particular, in the case of rendering the liquid crystal display of the present embodiment a liquid crystal display of an active matrix system using TFT, one of the electrode layers of the first and second alignment treatment substrates is rendered a full-face common electrode made of the transparent conductor and the other is rendered an electrode in which gate electrodes and source electrodes are provided in a matrix form and a TFT element and a pixel electrode are provided in a region surrounded by each of the gate electrodes and each of the source electrodes.

As a forming method of the second electrode layer, a physical vapor deposition method (PVD) such as chemical vapor deposition (CVD), sputtering, ion plating, or vacuum deposition can be cited.

(5) Other Structures (ii) Partition Wall

In the second alignment treatment substrate of the present embodiment, a partition wall may be formed on the second substrate. When a partition wall is formed on the first substrate in the first alignment treatment substrate, no partition wall is formed on the second substrate in the second alignment treatment substrate. Specifically, the partition wall may be formed on any of the first alignment treatment substrate and the second alignment treatment substrate.

As the material of the partition wall, a material usually used in the partition wall of liquid crystal displays may be used. Specifically, examples of the material of the partition wall may include resins, among which photosensitive resins are preferably used. This is because the photosensitive resins are easily patterned.

As the method of forming the partition wall, any of the usual patterning methods may be used without any particular limitation insofar as it can form the partition wall at a desired position. Examples of the method include a photolithographic method, ink jet method and screen printing method.

The partition wall is usually formed in plural and it is preferable that plural partition walls be formed regularly at desired positions and it is more preferable that plural partition walls be formed in substantially parallel at equal intervals. This is because if plural partition walls are formed at random positions when a liquid crystal display is manufactured by the One Drop Fill process, there is the case where it is difficult to exactly control the amount of a ferroelectric liquid crystal to be applied.

Although no particular limitation is imposed on the position of the partition wall, the partition wall is preferably formed in a non-pixel area. This is because it is desirable that the partition wall be formed in a non-pixel area having no influence on image display since an alignment defect of a ferroelectric liquid crystal is easily caused in the vicinity of the partition wall. When the second alignment treatment substrate is, for example, a TFT substrate, the partition walls may be provided on gate electrodes and source electrodes formed in matrix form.

The plural partition walls are formed in pattern. In this case, for example, the partition walls may be formed in stripe form, matrix form or frame form. When the partition walls are formed in matrix form e, the impact resistance can be improved. When the partition walls are formed in frame form and a liquid crystal display is formed by the One Drop Fill method, partition walls in frame form are formed on the periphery of the second substrate and a seal agent is applied to the outside periphery of the frame-like partition walls, thereby preventing a ferroelectric liquid crystal from being brought into contact with the seal agent which is still in an uncured state, making it possible to avoid a deterioration in the properties of the ferroelectric liquid crystal caused by contamination of impurities and the like contained in the seal agent.

When the partition walls are formed in stripe form and a liquid crystal display is formed by the One Drop Fill method, the partition walls are preferably formed such that the longitudinal direction of the stripe-like partition wall is substantially perpendicular to the alignment treatment direction of the alignment layer for reactive liquid crystal. This is because when the ferroelectric liquid crystal is applied along the partition walls in stripe form, the ferroelectric liquid crystal is induced to flow in substantially parallel to the alignment treatment direction of the alignment layer for reactive liquid crystal to improve aligning ability of the ferroelectric liquid crystal, whereby the generation of aligning defects can be limited.

Here, the term "substantially perpendicular" means that the longitudinal direction of the partition wall in stripe form forms an angle of 90°±~5° with the alignment treatment direction of the alignment layer for reactive liquid crystal and this angle is preferably 90°±1°. The above angle may be measured using a polarization microscope by observing the alignment direction of the liquid crystal molecule (the alignment treatment direction of the alignment layer for reactive liquid crystal) and the longitudinal direction of the partition wall in stripe form.

The pitch of the partition walls is designed to be about 100 μm to 10 mm, preferably in a range from 200 μm to 1.5 mm and more preferably in a range from 1.0 mm to 5.0 mm. This is because if the pitch of the partition walls is less than the above range, there is the possibility that display qualities are deteriorated by the alignment defect of the ferroelectric liquid crystal in the vicinities of the partition walls, whereas if the pitch of the partition walls exceeds the above range, there is the case where desired impact resistance is not obtained and it is difficult to keep a constant cell gap, though depending on the size of the liquid crystal display. Here, the pitch of the partition walls means the distance between the centers of adjacent partition walls.

The width of the partition wall is designed to be about 1 μm to 20 μm, preferably in a range from 2 μm to 10 μm and more preferably in a range from 5 μm to 10 μm. When partition walls in frame form are formed on the periphery of the first substrate, the width of this partition walls in frame form only needs to be enough to prevent the ferroelectric liquid crystal from being brought into contact with the seal agent put in an uncured state. Specifically, the width of the partition wall is designed to be about 10 μm to 3 mm, preferably in a range from 10 μm to 1 mm and more preferably in a range from 10 μm to 500 μm. This is because when the width of the partition wall exceeds the above range, the partition walls are also formed in the pixel area resultantly, leading to a decrease in effective pixel area and there is the case where good image display is not obtained, whereas when the width of the partition wall is less than the above range, there is the case where it is difficult to form the partition wall.

Moreover, the height of the partition wall is designed to be about the same size as the size of a cell gap.

The pitch, width and height of the partition walls may be measured using a scanning electron microscope (SEM) to observe the sections of the partition walls.

No particular limitation is imposed on the number of partition walls as long as the number of partition walls is two or more and the number is properly selected according to the size of the liquid crystal display.

No particular limitation is imposed on the position where the partition wall is formed insofar as it is formed on the second substrate. For example, the partition wall may be formed on the second substrate or may be formed on the second electrode layer.

(ii) Columnar Spacer

In the second alignment treatment substrate in this embodiment, a columnar spacer may be formed on the second substrate. When the columnar spacer is formed on the first substrate in the first alignment treatment substrate, no columnar spacer is formed on the second substrate in the second alignment treatment substrate. In other words, the columnar spacer may be formed on any of the first alignment treatment substrate and the second alignment treatment substrate.

As the material of the columnar spacer, a material usually used for the columnar spacer in liquid crystal displays may be used. Specific examples of the material of the columnar spacer may include resins, among which photosensitive resins are preferably used. This is because the photosensitive resins are easily patterned.

As the method of forming the columnar spacer, any usual patterning method may be used without any particular limitation insofar as it can form the columnar spacer at a desired position. Examples of the method include a photolithographic method, ink jet method and screen printing method.

The columnar spacer is usually formed in plural and it is preferable that plural columnar spacers be formed regularly at desired positions and it is more preferable that plural columnar spacers be formed at equal intervals. This is because if plural columnar spacers are formed at random positions when a liquid crystal display is manufactured by the One Drop Fill method, there is the case where it is difficult to exactly control the amount of a ferroelectric liquid crystal to be applied.

The pitch of the columnar spacers is designed to be about 100 μm to 3 mm, preferably in a range from 200 μm to 1.5 mm and more preferably in a range from 300 μm to 1.0 mm. This is because if the pitch of the columnar spacers is less than the above range, there is the possibility that display qualities are deteriorated by the alignment defect of the ferroelectric liquid crystal in the vicinities of columnar spacers, whereas if the pitch of the columnar spacers exceeds the above range, there is the case where no desired impact resistance is obtained and it is difficult to keep a constant cell gap, though depending on the size of the liquid crystal display. Here, the pitch of the columnar spacers means the distance between the centers of adjacent columnar spacers.

As to the size of the columnar spacer, the diameter of the bottom of the columnar spacer is designed to be about 1 μm to 100 μm, preferably in a range from 2 μm to 50 μm and more preferably in a range from 5 μm to 20 μm in the case where the columnar spacer has a cylindrical form for example. This is because when the size of the columnar spacer exceeds the above range, the columnar spacers are also formed in the pixel area resultantly, leading to a decrease in effective pixel area and there is the case where no good image display is obtained, whereas when the size of the columnar spacer is less than the above range, there is the case where it is difficult to form the columnar spacer.

Moreover, the height of the columnar spacer is designed to be about the same as the size of a cell gap.

The pitch, size and height of the columnar spacers may be measured using a scanning electron microscope (SEM) to observe the sections of the partition walls.

Examples of the shape of the columnar spacer may include a cylindrical form, prism form and truncated conical form.

Although no particular limitation is imposed on the position of the columnar spacer, the columnar spacer is preferably formed in a non-pixel area. This is because it is desirable that the columnar spacer be formed in a non-pixel area having no influence on image display since an alignment defect of a ferroelectric liquid crystal is easily caused in the vicinity of the columnar spacer. When the second alignment treatment substrate is, for example, a TFT substrate, the columnar spacers may be provided on gate electrodes and source electrodes formed in matrix form.

No particular limitation is imposed on the number of columnar spacers as long as the number of columnar spacers is two or more and the number is properly selected according to the size of the liquid crystal display.

No particular limitation is imposed on the position of the columnar spacer to be formed insofar as the columnar spacer is formed on the second substrate and, for example, the columnar spacer may be formed on any of the second substrate and the second electrode layer.

(iii) Colored Layer

In the second alignment treatment substrate used in this embodiment, a colored layer may be formed on the second substrate. When a colored layer is formed on the first substrate in the first alignment treatment substrate, no colored layer is formed on the second substrate in the second alignment treatment substrate. Specifically, the colored layer may be formed on any of the first alignment treatment substrate or the second alignment treatment substrate.

When the colored layer is formed, a color filter system liquid crystal display that can realize color display by the colored layer can be obtained.

As the method of forming the colored layer, methods for forming colored layers in usual color filters may be used. As this method, the pigment dispersion methods (color resist method and etching method), printing methods and ink jet methods may be used for example.

3. First Alignment Treatment Substrate

The first alignment treatment substrate used in this embodiment comprises a first substrate, a first electrode layer formed on the first substrate and an oblique vapor deposition-alignment layer formed on the first electrode layer.

In this case, the structures of the first substrate and first electrode layer and other structures are the same as the structures of the second substrate and second electrode layer and other structures in the above-mentioned second alignment treatment substrate and therefore, explanations thereof are omitted. The oblique vapor deposition-alignment layer will be explained.

(1) Oblique Vapor Deposition-Alignment Layer

Any alignment layer may be used as the oblique vapor deposition-alignment layer to be used in this embodiment without any particular limitation insofar as it can align the ferroelectric liquid crystal. As the constituent of the oblique vapor deposition-alignment layer, inorganic materials which can be formed into a film by the oblique vapor deposition method are used and examples of the constituent of the oblique vapor deposition-alignment layer may include silicon monoxide (SiO), silicon dioxide ($SiO_2$) and titanium dioxide ($TiO_2$). Among these inorganic materials, SiO is preferably used.

As mentioned above, it is known that the oblique vapor deposition-alignment layer has a channel structure and a columnar structure, and that the channel structure and the columnar structure are changed by the angle of the vapor deposition and the direction of the alignment of the liquid crystal is changed. It is also known that the angle and density of the columnar fine structure are changed by the angle of the vapor deposition with a normal line of the surface of the substrate. It is therefore important to control the angle and density of the columnar fine structure of the oblique vapor deposition layer in order to control the pre-tilt angle of the liquid crystal molecule in a specified range. As to the oblique vapor deposition-alignment layer, Liquid crystal handbook editorial committee, "CRYSTAL LIQUID HANDBOOK", Maruzen Co., Ltd., Oct., 30 (2000), p. 229-230) may be used as a reference.

As mentioned above, the pre-tilt angle of the liquid crystal molecule can be controlled by changing the angle (angle of vapor deposition) in the direction of the vapor deposition with the normal line of the surface of the first substrate. This angle of the vapor deposition may be designed to be about 40° to 60° and preferably about 50° to 60°. If the angle of the vapor deposition is controlled in the above range, the pre-tilt angle of the liquid crystal molecule can be controlled in a desired range.

As the method of forming the oblique vapor deposition-alignment layer, the oblique vapor deposition method is used. For example, the first substrate having formed thereon the first electrode layer is turned at an angle of a with the direction of the vapor deposition to tilt the first substrate such that the direction of the normal line of the surface of the first substrate forms a specified angle with the direction of the incident (direction of the vapor deposition) of the vapor deposition particles, whereby the oblique vapor deposition-alignment layer can be formed on the first substrate from the direction oblique to the first substrate.

The thickness of the oblique vapor deposition-alignment layer is designed to be about 10 nm to 500 nm and preferably in a range from 30 nm to 200 nm.

4. Polarizing Plate

The polarizing plate used in the present embodiment is not particularly limited as long as it allows transmission only in a specific direction out of the wave motions of a light beam, and thus one commonly used as a polarizing plate for a liquid crystal display can be used.

5. Method for Driving the Liquid Crystal Display

The liquid crystal display of the present embodiment can make use of the high speed response properties of the ferroelectric liquid crystal. The display is therefore suitable for being displayed by a field sequential color system, in which each pixel is subjected to time sharing and high speed response properties is in particular required in order to obtain good moving image display properties. According to the present embodiment, inconveniences in the case of displaying the liquid crystal display by a field sequential color system can be avoided.

The method for driving the liquid crystal display of the present embodiment is not limited to any field sequential method, and color display may be attained by using the colored layer.

The liquid crystal display of the present embodiment is preferably driven by an active matrix system using the thin film transistor (TFT). The adoption of the active matrix system using TFT makes it possible to attain high-quality display since target pixels can be certainly lighted on or off.

In this embodiment, the first alignment treatment substrate may be the TFT substrate and the second alignment treatment substrate may be the common electrode substrate, or the first alignment treatment substrate may be the common electrode substrate and the second alignment treatment substrate may be TFT. Particularly, it is preferable that the first alignment treatment substrate be the TFT substrate and the second alignment treatment substrate be the common electrode substrate.

In, for example, the liquid crystal display shown in FIG. 10, the switch of the TFT element 25 is ON when the gate electrode 24$x$ is made to have a potential as high as about 30 V, whereby signal voltage is applied to the ferroelectric liquid crystal by the source electrode 24$y$, and when the potential of the gate electrode 24$y$ is made to drop to a potential as low as −10 V, the switch of the TFT element 25 is OFF. In the switch-off state, voltage is applied across the common electrode (second electrode layer) 14 and the gate electrode 24$x$ in such a manner that the common electrode (second electrode layer) 14 side is made positive as illustrated in FIG. 11. In this switch-off state, the ferroelectric liquid crystal is not made to work and therefore, its pixel is put into a dark state.

In this embodiment, the direction of the spontaneous polarization of the liquid crystal molecule tends to direct toward the first alignment treatment substrate side by a polar surface interaction in a non-voltage applied state. Specifically, in the switch-off state, the direction of the spontaneous polarization Ps of the liquid crystal molecule 1 tends to direct toward the TFT substrate (first alignment treatment substrate) 7 side as illustrated in FIG. 11. Therefore, the direction of the spontaneous polarization is unaffected by the voltage applied across the common electrode (second electrode layer) 14 and the gate electrode 24$x$.

On the other hand, if the direction of the spontaneous polarization of the liquid crystal molecule tends to direct toward the second alignment treatment substrate side in a non-voltage applied state, the direction of the spontaneous polarization is inverted in the vicinity of the area where the gate electrode is disposed in the switch-off state by the influence of the voltage applied across the common electrode and the gate electrode. Then, the ferroelectric liquid crystal is made to work in the vicinity of the area where the gate electrode is formed though the switch is OFF, causing light leakage.

In this embodiment as mentioned above, on the other hand, the direction of the spontaneous polarization is not affected by the voltage applied across the common electrode and the gate electrode and therefore, no light leakage is caused. Therefore, in this embodiment, the direction of the spontaneous polarization is controlled, the first alignment treatment substrate is used as the TFT substrate and the second alignment treatment substrate is used as the common electrode substrate, whereby light leakage in the vicinity of the gate electrode can be prevented.

A molecular direction of the ferroelectric liquid crystal used in this embodiment is changed by about 2 times a tilt angle of the ferroelectric liquid crystal parallel to the surface of the first alignment treatment substrate when a negative voltage is applied to the second electrode layer.

Suppose that the case where the voltage of the pixel electrode is relatively high is defined as the case plus-polarized voltage is applied, whereas the case where the voltage of the pixel electrode is relatively low is defined as the case where minus-polarized voltage is applied. The definition like this allows the following explanations as to this embodiment. Specifically, when the first alignment treatment substrate is the common electrode substrate and the second alignment treatment substrate is the TFT substrate, the molecular direction of the ferroelectric liquid crystal is changed by about 2 times a tilt angle of the ferroelectric liquid crystal parallel to the surface of the first alignment treatment substrate when the voltage of the pixel electrode is relatively lower than that of the common electrode, that is, in the case where minus-polarized voltage is applied. When the first alignment treatment substrate is the TFT substrate and the second alignment treatment substrate is the common electrode substrate, the molecular direction of the ferroelectric liquid crystal is changed by about 2 times a tilt angle of the ferroelectric liquid crystal parallel to the surface of the first alignment treatment substrate when the voltage of the pixel electrode is relatively higher than that of the common electrode, that is, in the case where plus-polarized voltage is applied.

The liquid crystal display of the present embodiment may be driven in a segment mode.

6. Process for Producing the Liquid Crystal Display

Next, a process for producing the liquid crystal display of the present embodiment is described. The liquid crystal display of the present embodiment can be produced by a method used ordinarily as a liquid crystal display producing process such as a vacuum injection method or One Drop Fill method.

Hereinafter, a manufacturing method of the liquid crystal display driven by an active matrix system using a TFT element will be described as an example of the producing method of liquid crystal display of the present invention.

In the vacuum injection method, first, a transparent electroconductive film is formed on a second substrate by vacuum injection method, so as to prepare a full-face common electrode. Furthermore, a photo-dimerization type material is coated onto the common electrode, and the resultant is subjected to photo alignment treatment to form an alignment layer for reactive liquid crystal. A fixed liquid crystal layer forming coating solution is coated onto the alignment layer for reactive liquid crystal and the reactive liquid crystals are aligned and fixed to form a fixed liquid crystal layer. A second alignment treatment substrate is thereby formed. An electroconductive film is patterned into a matrix form on a first substrate, thereby forming gate electrodes and source electrodes. By patterning the transparent electroconductive film, pixel electrodes are formed and TFT elements are then set up thereon. Furthermore, silicon oxide is formed into a layer by an oblique vapor deposition method onto the gate electrodes, the source electrodes, the TFT elements and the pixel electrodes to prepare a first alignment treatment substrate.

Next, beads are dispersed, as spacers, onto the fixed liquid crystal layer of the second alignment treatment substrate, and then a sealing agent is coated-onto the circumference thereof. The first alignment treatment substrate and the second alignment treatment substrate are provided such that the direction of the oblique vapor deposition method and that of the photo alignment treatment method becomes substantially perpendicular to each other and adhered. The substrates are then thermally compressed. A capillary effect is used to inject a ferroelectric liquid crystal, in an isotropic liquid state, into an injecting opening therein. The injecting opening is sealed up with an ultra violet curing resin or the like. Thereafter, the ferroelectric liquid crystal is slowly cooled so as to be aligned.

In the One Drop Fill method, first, a transparent electroconductive film is formed on a second substrate by a vacuum injection method, so as to prepare a full-face common electrode. Partition walls are formed in pattern on the common electrode layer by a photolithography method. Furthermore, a photo-dimerization type material is coated onto the common electrode and the partition walls, and the resultant is subjected to photo alignment treatment to form an alignment layer for reactive liquid crystal. A fixed liquid crystal layer forming coating solution is coated on the alignment layer for reactive liquid crystal to align the reactive liquid crystals and to fix. Thereby a fixed liquid crystal layer is formed and a second alignment treatment substrate is prepared. An electroconductive film is patterned into a matrix form on a first substrate, thereby forming gate electrodes and source electrodes. By patterning the transparent electroconductive film, pixel electrodes are formed and TFT elements are then set up thereon. Furthermore, silicon oxide is formed into a layer by an oblique vapor deposition method onto the gate electrodes, the source electrodes, the TFT elements and the pixel electrodes, and oxidized silicon to prepare a first alignment treatment substrate.

Next, ferroelectric liquid crystals in an isotopic state are discharged onto the fixed liquid crystal layer of the second alignment treatment substrate by an ink jet method. A sealing agent is coated to the circumference of the first alignment treatment substrate. The first alignment treatment substrate and the second alignment treatment substrate are subsequently heated to a temperature where the ferroelectric liquid crystals exhibit a nematic phase or an isotropic phase. The two substrates are provided such that the direction of alignment treatment and that of the alignment treatment becomes substantially parallel to each other, and they are superimposed under reduced pressure and adhered via a sealing agent. The liquid crystal cell is slowly cooled down to room temperature and sealed ferroelectric liquid crystals are thereby aligned.

In aligning the ferroelectric liquid crystal, if the polymerizable monomer is added thereto, the polymerizable monomer is polymerized after the alignment of the ferroelectric liquid crystal. A polymerization method of the polymerizable monomer is appropriately selected in accordance with the kind of the polymerizable monomer. For example, when an ultra violet curable resin monomer is used as the polymerizable monomer, the polymerizable monomer can be polymerized by irradiation an UV.

Further, in polymerizing the polymerizable monomer, voltage may or may not be applied to the liquid crystal layer constituted by the ferroelectric liquid crystal. It is preferable to polymerize the polymerizable monomer without applying a voltage to the liquid crystal layer.

Polarizing plates may be adhered to the top and bottom of the liquid crystal cell obtained as the above.

II. Second Embodiment

Next, a second embodiment of the liquid crystal display of the present invention will be explained.

The inventors of the present invention have made various studies in the same manner as in the first embodiment and obtain such teachings that when the ferroelectric liquid crystal is held between photo alignment layers respectively using an oblique vapor deposition-alignment layer and a photo-isomerization material, the positive electrode of the spontaneous polarization of a ferroelectric liquid crystal tends to direct toward the side of the photo alignment layer using the photo-isomerization material.

Hereinafter, a liquid crystal display of the present embodiment will be explained in detail.

The liquid crystal display of the second embodiment in the present invention comprises: a first alignment treatment substrate having a first substrate, a first electrode layer formed on the first substrate, and an oblique vapor deposition-alignment layer formed on the first electrode layer; a second alignment treatment substrate having a second substrate, a second electrode layer formed on the second substrate, and a photo alignment layer which is formed on the second electrode layer and using a photo-isomerization type material which imparts anisotropy to an alignment layer by generating a photo-isomerization reaction; and a ferroelectric liquid crystal held between the oblique vapor deposition-alignment layer of the first alignment treatment substrate and the photo alignment layer of the second alignment treatment substrate; in which the first alignment treatment substrate and the second alignment treatment substrate are provided such that the oblique vapor deposition-alignment layer and the photo alignment layer face each other, characterized in that the ferroelectric liquid crystal exhibits mono-stability, and further characterized in that a molecular direction of the ferroelectric liquid crystal is changed by about 2 times a tilt angle of the ferroelectric liquid crystal parallel to a surface of the first alignment treatment substrate when a negative voltage is applied to the first electrode layer (herein after, the "photo alignment layer using a photo-isomerization type material which imparts anisotropy to an alignment layer by generating a photo-isomerization reaction" may be referred to as "photo-isomerization type photo alignment layer").

With reference to the drawings, the liquid crystal display of the present embodiment will be explained.

Figure 14:
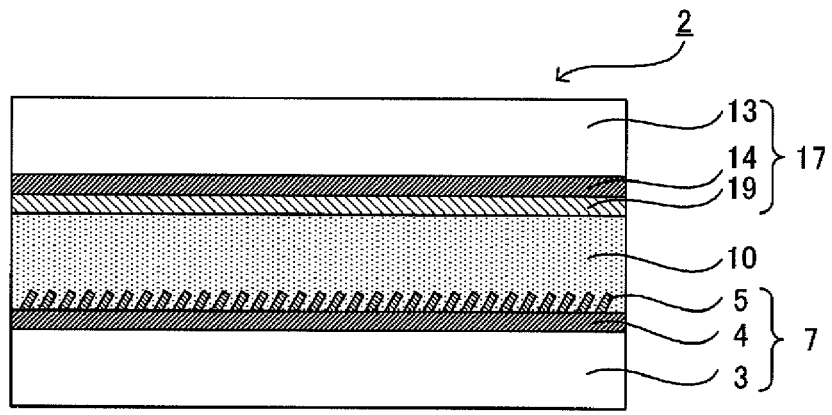
FIG. 14 is a schematic sectional view illustrating another example of the liquid crystal display of the present invention.

FIG. 14 is a schematic sectional view illustrating an example of the liquid crystal display of the invention. In the liquid crystal display 2 illustrated in FIG. 14, a first alignment treatment substrate 7 in which a first electrode layer 4 and an oblique vapor deposition-alignment layer 14 are successively formed on a first substrate 3, and a second alignment treatment substrate 17 in which a second electrode layer 14 and a photo-isomerization type photo alignment layer 19 are successively formed on a second substrate 13 are facing each other, and a ferroelectric liquid crystal is held between the oblique vapor deposition-alignment layer 5 of the first alignment treatment substrate 7 and the photo-isomerization type photo alignment layer 19 of the second alignment treatment substrate 17 to constitute a liquid crystal layer 10. The oblique vapor deposition-alignment layer 5 and the photo-isomerization type photo alignment layer 19 are disposed such that the direction of the vapor deposition of the oblique vapor deposition-alignment layer is substantially perpendicular to the direction of the alignment treatment of the photo-isomerization type photo alignment layer.

As mentioned above, the inventors have obtained such teaching that when the ferroelectric liquid crystal is held between the oblique vapor deposition-alignment layer and the photo-isomerization type photo alignment layer, the direction of the positive electrode of the spontaneous polarization of the ferroelectric liquid crystal tends to direct toward the photo-isomerization type photo alignment layer side. The reason of the above is thought to be an effect of a polar surface interaction, which is an interaction between the ferroelectric liquid crystal, and the oblique vapor deposition-alignment layer surface and the photo-isomerization type photo alignment layer surface.

Figure 15A:
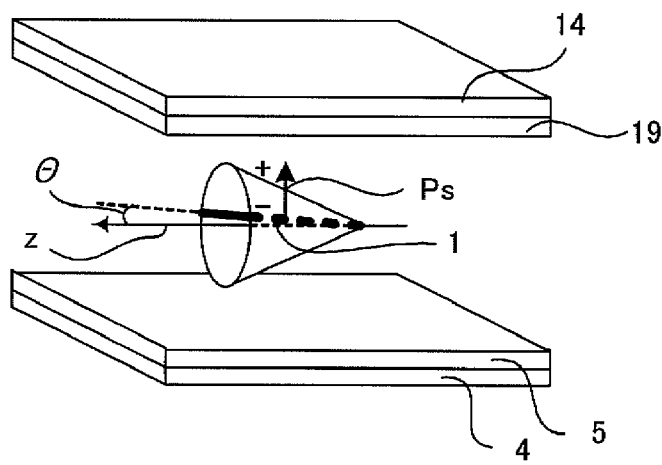
FIGS. 15A and 15B are each a schematic view illustrating another example of the alignment state of the ferroelectric liquid crystal.
Figure 15B:
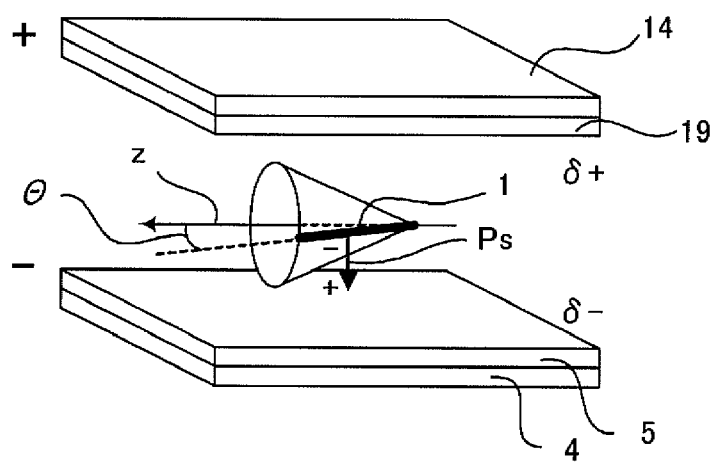

An example of the alignment state of the ferroelectric liquid crystal used in the present embodiment is shown in FIG. 15A. The oblique vapor deposition-alignment layer possesses a tendency to have a stronger plus polarity when the oblique vapor deposition-alignment layer and the photo-isomerization type photo alignment layer are compared. As shown in FIG. 15B, polar surface interaction makes the spontaneous polarization Ps of the liquid crystal molecule 1 to have a tendency to be directed to the side of the photo-isomerization type photo alignment layer 19 when no voltage is applied.

As illustrated in FIG. 15B, when the negative voltage is applied to the first electrode layer 4 and the positive voltage to the second electrode layer 14, the spontaneous polarization Ps of the liquid crystal molecules 1 is directed to the side of the oblique vapor deposition-alignment layer 5 by the effect of the polarity of the applied voltage.

In FIGS. 15A and 15B, the first substrate and the second substrate are omitted and the liquid crystal molecule shows the ferroelectric liquid crystal.

Furthermore, when a positive voltage is applied to the first electrode layer and a negative voltage to the second electrode layer, the spontaneous polarization Ps of the liquid crystal molecules 1 is directed to the side of the photo-isomerization type photo alignment layer 19 by the effect of the polarity of the applied voltage, as illustrated in FIG. 15A. In this case, the liquid crystal molecule turns into the same alignment state as in the non-voltage-applying state.

The direction of spontaneous polarization becomes directed to the direction mentioned-above is because the direction of spontaneous polarization is directed to a direction where polarization of the ferroelectric liquid crystal and polarization of the alignment layer or polarity of the voltage applied strike an electrical balance so that the liquid crystal molecule are made in an electrically stable state.

When the liquid crystal display is made from the non-voltage-applying state or the state when the positive voltage is applied to the first electrode layer (FIG. 15A) to the state when the minus voltage is applied to the first electrode layer (FIG. 15B), the liquid crystal molecule 1 is rotated by an angle of about 2θ, as illustrated in FIG. 5, by repulsion between the minus polarity of this applied voltage and the minus polarity of the spontaneous polarization of the liquid crystal molecule. In other words, when a negative voltage is applied to the first electrode layer, the molecular direction of the ferroelectric liquid crystal is changed to parallel to the first alignment treatment substrate surface by about 2 times the tilt angle θ of the ferroelectric liquid crystal.

As described above, in the present embodiment, the direction of the spontaneous polarization of the liquid crystal molecule can be controlled by utilizing the tendency that the spontaneous polarization of the ferroelectric liquid crystal directs to the side of the photo-isomerization type photo alignment layer.

In this embodiment, the direction of the spontaneous polarization can be controlled in the same manner as in the first embodiment and therefore, the alignment of the ferroelectric liquid crystal can be mono-stabilized without generating alignment defect. Specifically, the ferroelectric liquid crystal exhibits mono-stability. The ferroelectric liquid crystal is aligned not based on the electric field induced technique and the liquid crystal display of this embodiment therefore has the advantage that even if it is heated up to a temperature higher than the phase transition temperature, it can maintain its alignment state and suppress the generation of alignment defects.

In this embodiment, the use of the oblique vapor deposition-alignment layer in the same manner as in the first embodiment makes possible to control the pre-tilt angle of the liquid crystal molecule, with the result that the generation of zig-zag defects and hairpin defects can be suppressed.

Preferably 80% or more, more preferably 90% or more and still more preferably 95% or more of all ferroelectric liquid crystals in the liquid crystal display of this embodiment are those of which the molecular direction is changed about 2 times a tilt angle of the ferroelectric liquid crystal when a negative voltage is applied to the first electrode layer. This is because a good contrast ratio is obtained in the above range.

Here, the method of measuring the above ratio is already described in the first embodiment, and therefore, the explanations thereof are omitted.

The liquid crystal display having a polarizing plate is put into a dark state when no voltage is applied or positive voltage is applied to the first electrode layer, and into a bright state when a negative voltage is applied to the first electrode layer. Therefore, when the liquid crystal display is driven by the field sequential color system, it is possible to avoid the situation where the liquid crystal display is put into a bright state by scanning synchronously with the backlight of R (red) when the backlight of G (green) is tuned on as illustrated in FIG. 9.

The symbols and the like in FIG. 9 are the same as those shown in FIG. 19.

Figure 16:
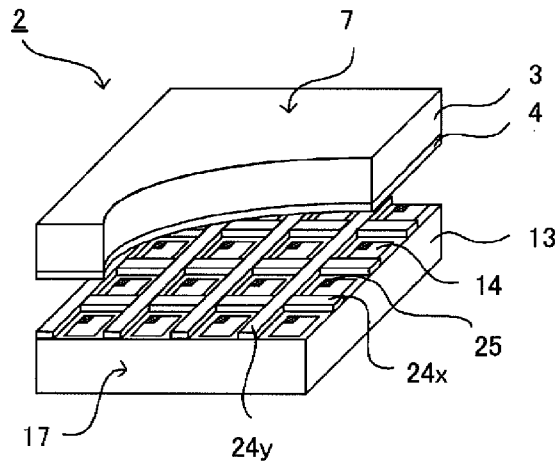
FIG. 16 is a schematic perspective view illustrating another example of the liquid crystal display of the invention.
Figure 17:
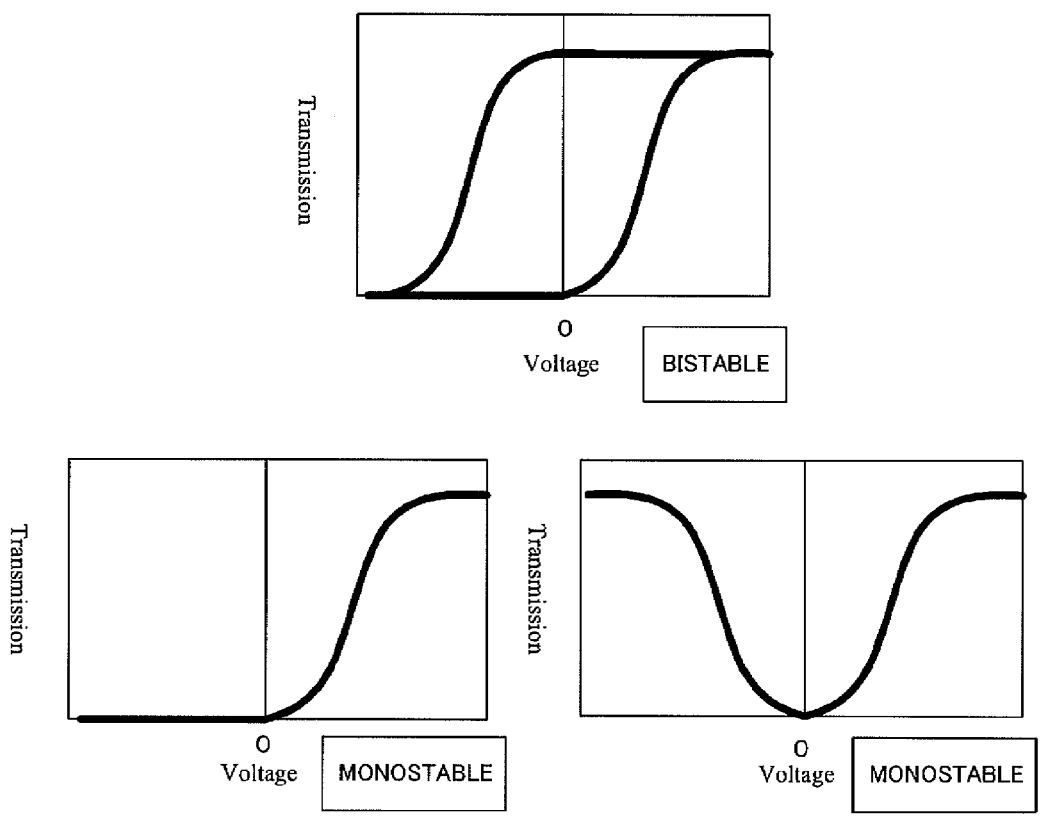
FIG. 17 is graphs each showing changes in transmission to a voltage applied to ferroelectric liquid crystals.
Figure 18:
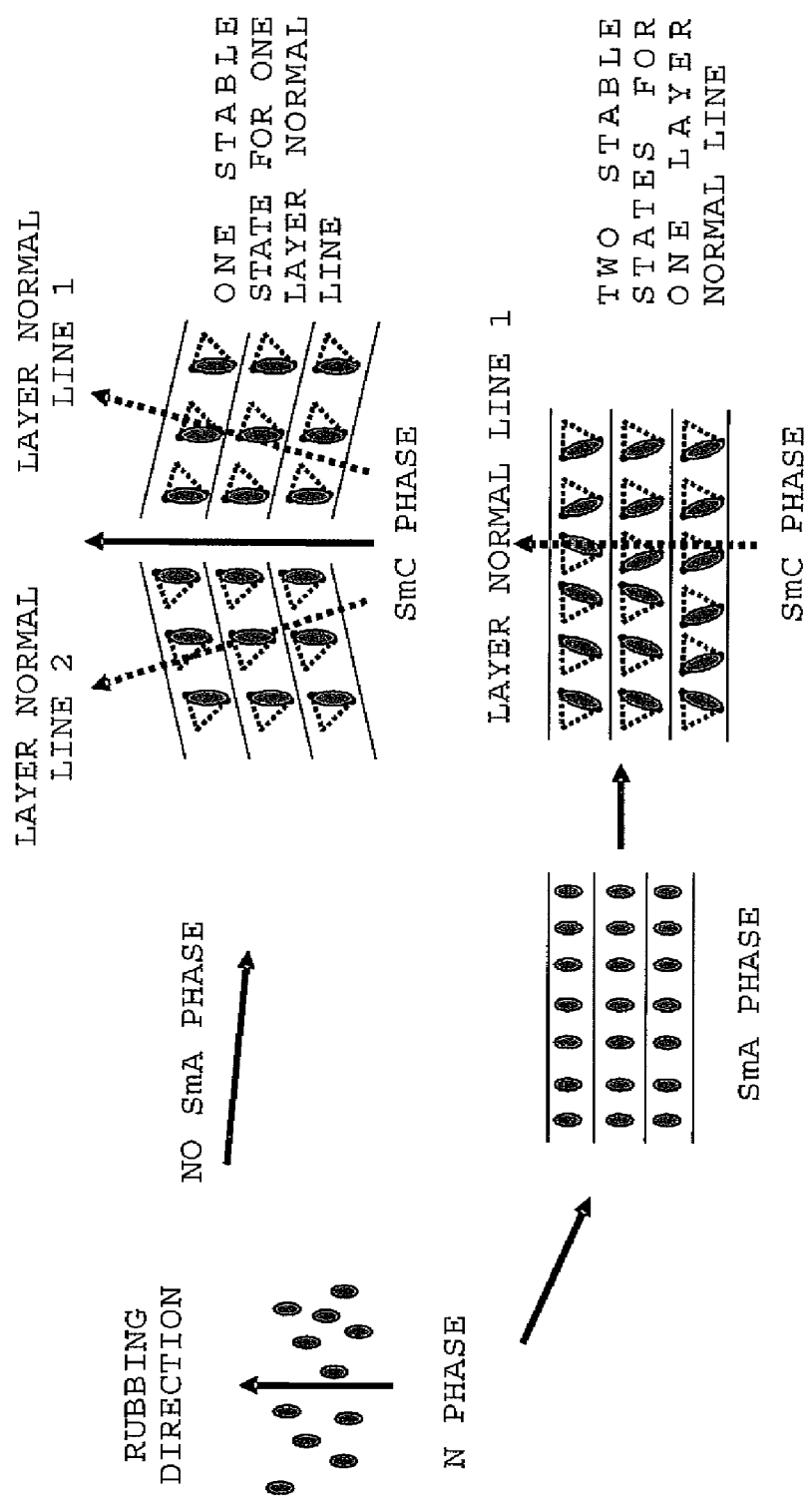
FIG. 18 is a view illustrating a difference of alignment based on a difference of the phase sequence that ferroelectric liquid crystal has.

The liquid crystal display in this embodiment may be driven by the active matrix system using a thin film transistor (TFT). In this case, it is preferable that the first alignment treatment substrate be a common electrode substrate in which the first electrode layer is a common electrode and the second alignment treatment substrate be a TFT substrate having TFT formed on a second substrate. FIG. 16 is a schematic perspective view showing an example of a liquid crystal display used in the active matrix system using TFT.

The liquid crystal display 2 illustrated in FIG. 16 comprises a common electrode substrate (first alignment treatment substrate 7) in which a common electrode (first electrode layer 4) is formed on a first substrate 3 and a TFT substrate (second alignment treatment substrate 17) in which a TFT element 25 is provided in matrix form on the second substrate 13. In the TFT substrate (second alignment treatment substrate 17), gate electrodes 24x, source electrodes 24y and pixel electrodes (second electrode layer 14) are formed. These gate electrodes 24x and source electrodes 24y are provided in vertical directions and in horizontal directions respectively, wherein signals are applied to the gate electrodes 24x and source electrodes 24y to operate the TFT element 25, thereby enabling the ferroelectric liquid crystal to be driven. The parts where the gate electrodes 24x and the source electrodes 24y cross each other are insulated by an insulation layer (not shown), so that the signals of the gate electrode 24x and the signals of the source electrode 24y can act independently. The part enclosed by the gate electrode 24x and the source electrode 24y is a pixel which is a minimum unit that drives the liquid crystal display of this embodiment. In each pixel, at least one or more TFT elements 25 and pixel electrodes (second electrode layer 14) are formed. Then, the TFT element of each pixel can be operated by applying signal voltage to the gate electrode and source electrode sequentially. In FIG. 16, the liquid crystal layer, the oblique vapor deposition-alignment layer and the photo-isomerization type photo alignment layer are omitted.

In, for example, the liquid crystal display mentioned above, the switch of the TFT element is ON when the gate electrode is made to have a potential as high as about 30 V, whereby signal voltage is applied to the ferroelectric liquid crystal by the source electrode, and when the potential of the gate electrode is made to drop to a potential as low as −10 V, the switch of the TFT element is OFF. In the switch-off state, voltage is applied across the common electrode (first electrode layer 4) and the gate electrode 24x in such a manner that the common electrode (first electrode layer 4) side is made positive. In this switch-off state, the ferroelectric liquid crystal is not made to work and therefore, its pixel is put into a dark state.

In this embodiment, as mentioned, the direction of the spontaneous polarization of the liquid crystal molecule tends to direct toward the second alignment treatment substrate side by a polar surface interaction in a non-voltage applied state. Specifically, in the switch-off state, the direction of the spontaneous polarization of the liquid crystal molecule tends to direct toward the TFT substrate (second alignment treatment substrate 17) side. Therefore, the direction of the spontaneous polarization is unaffected by the voltage applied across the common electrode (first electrode layer 4) and the gate electrode 24x.

On the other hand, if the direction of the spontaneous polarization of the liquid crystal molecule tends to direct toward the common electrode substrate side in a non-voltage applied state, the direction of the spontaneous polarization is inverted in the vicinity of the area where the gate electrode is disposed in the switch-off state by the influence of the voltage applied across the common electrode and the gate electrode. Then, the ferroelectric liquid crystal is made to work in the vicinity of the area where the gate electrode is formed though the switch is OFF, and causing light leakage.

In this embodiment as mentioned above, on the other hand, the direction of the spontaneous polarization is not affected by the voltage applied across the common electrode and the gate electrode and therefore, no light leakage is caused. Therefore, in this embodiment, the direction of the spontaneous polarization is controlled, the first alignment treatment substrate is used as the common electrode substrate, whereby light leakage in the vicinity of the gate electrode can be prevented.

As the first alignment treatment substrate is described in the first embodiment, explanations thereof are omitted here. Each of the other constituent members of the liquid crystal display of the present embodiment will be described in detail herein after.

1. Liquid Crystal Layer

The ferroelectric liquid crystal used in the present embodiment exhibits mono-stability, and a molecular direction of the ferroelectric liquid crystal is changed by about 2 times a tilt angle of the ferroelectric liquid crystal parallel to a surface of the first alignment treatment substrate when a negative voltage is applied to the first electrode layer.

The wording "the molecular direction of the ferroelectric liquid crystal is changed by about 2 times the tilt angle $\theta$ of the ferroelectric liquid crystal to the first alignment treatment substrate surface when a negative voltage is applied to the first electrode layer" means the following: the liquid crystal molecule is stabilized into a single state on the cone when no voltage is applied thereto; when a negative voltage is applied to the first electrode layer, the liquid crystal molecule is inclined to one side on the cone from the mono-stability state; when a positive voltage is applied to the first electrode layer, the liquid crystal molecule is kept in the mono-stability state or is inclined from the mono-stability state to the side reverse to the side when a negative voltage is applied to the first electrode layer; and the inclination angle of the liquid crystal molecule from the mono-stability state when a negative voltage is applied to the first electrode layer is larger than the inclination angle of the liquid crystal molecule from the mono-stability state when a positive voltage is applied to the first electrode layer.

FIGS. 12A to 12C are each a schematic view illustrating an example of the alignment state of a ferroelectric liquid crystal exhibiting mono-stability. FIGS. 12A, 12B and 12C illustrate a case where no voltage is applied thereto, a case where a negative voltage is applied to the first electrode layer, and a case where a positive voltage is applied to the first electrode layer, respectively. In the non-voltage-applied case, liquid crystal molecule 1 is stabilized into a single state on the cone (FIG. 12A). In the case where a negative voltage is applied to the first electrode layer, the liquid crystal molecule 1 is inclined from the stabilized state (broken line) to one side (FIG. 12B). In the case where a positive voltage is applied to the first electrode layer, the liquid crystal molecule 1 is inclined from the stabilized state (broken line) to the side reverse to the side when a negative voltage is applied to the first electrode layer (FIG. 12C). In this case, the inclination angle $\delta$ when the negative voltage is applied to the first electrode layer is larger than the inclination angle (o when the positive voltage is applied to the first electrode layer. In FIGS. 12A to 12C, "d" represents the direction of alignment treatment, and "z" represents a layer normal line.

When a negative voltage is applied to the first electrode layer, the liquid crystal molecule is inclined from the mono-stability state to one side on the cone at an angle corresponding to the applied voltage. As illustrated in FIG. 12A, in the ferroelectric liquid crystal, a position A (the direction of the liquid crystal molecule 1), a position B (the alignment treatment direction "d"), and a position C are not necessarily consistent with each other. As illustrated in FIG. 12B, therefore, the maximum inclination angle $\delta$ when a negative voltage is applied to the first electrode layer is about 2 times the tilt angle $\theta$ (angle $2\theta$).

As illustrated in, for example, FIG. 5, the direction of the liquid crystal molecule 1 is changed by about 2 times the tilt angle $\theta$ (angle $2\theta$) parallel to the first alignment treatment substrate surface. The wording "being changed by about 2 times the tilt angle $\theta$" means a case of being changed by an angle of $2\theta$ to $2\theta-5°$.

As the measurement method of the angle where the molecular direction of the ferroelectric liquid crystal is changed parallel to the first alignment treatment substrate surface is described in the first embodiment, explanations thereof are omitted here.

As described above, when a negative voltage is applied to the first electrode layer, the liquid crystal molecule is inclined from the mono-stability state thereof to one side on the cone at an angle corresponding to the applied voltage. Thus, in the case that the liquid crystal display is actually driven, it cannot be said that the direction of the liquid crystal molecule is changed by about 2 times the tilt angle when a negative voltage is applied to the first electrode layer.

In a liquid crystal display using a ferroelectric liquid crystal exhibiting mono-stability, the transmittance thereof depends on the tilt angle of a liquid crystal molecule when voltage is applied. When either positive or negative voltage is applied, the liquid crystal molecule tilts on a cone and therefore, as shown in, for example, FIGS. 13A and 14B, the tilt angle of the liquid crystal molecule varies corresponding to the magnitude of the applied voltage, whereby the transmittance varies. At this time, the transmittance reaches a maximum when the tilt angle of the liquid crystal molecule is changed by 45° from that of the mono-stable state.

Therefore, in order to attain a high transmittance, it is preferable to use a ferroelectric liquid crystal which can be changed in the tilt angle of a liquid crystal molecule by 45° from that of the mono-stable state when a negative voltage is applied to the first electrode layer in an actual operation.

When, for example, a ferroelectric liquid crystal which can be changed in the tilt angle of a liquid crystal molecule by a maximum tilt angle $\delta$ of 45° or more from that of the monostable state as shown in each of FIGS. 12A to 12C is used, a change in the tilt angle of the liquid crystal molecule from that of the mono-stable state can be made to be 45° when a negative voltage is applied to the first electrode layer in the case of actually driving the liquid crystal display. This is because, as mentioned above, the direction of the liquid crystal molecule does not vary about 2 times a tilt angle when a negative voltage is applied to the first electrode layer in an actual operation.

Other particulars of the ferroelectric liquid crystal and other particulars of the liquid crystal layer are already described in the above first example and therefore, explanations thereof are omitted.

2. Second Alignment Treatment Substrate

Next, the second alignment treatment substrate to be used in this embodiment will be explained. The second alignment treatment in this embodiment comprises a second substrate, a second electrode layer formed on the second substrate and a photo alignment layer formed on the second electrode layer and using a photo-isomerization type material which imparts anisotropy to the alignment layer by generating a photo-isomerization reaction to thereby.

The second substrate and the second electrode layer are already described in the first embodiment and therefore, explanations thereof are omitted here. The photo alignment layer using a photo-isomerization type material which imparts anisotropy to the alignment layer by generating a photo-isomerization reaction is the same as that described in the paragraph "Alignment layer for reactive liquid crystal" in the first embodiment and therefore, explanations thereof are omitted here. Further, other structures of the second alignment treatment substrate are the same as those described in the first embodiment and therefore, explanations thereof are omitted here.

3. Driving Method of the Liquid Crystal Display

The driving method of the liquid crystal display in this embodiment is the same as in the first embodiment.

In this embodiment, the first alignment treatment substrate may be the TFT substrate and the second alignment treatment substrate may be the common electrode substrate, or the first alignment treatment substrate may be the common electrode substrate and the second alignment treatment substrate may be the TFT substrate. Particularly, as mentioned, it is preferable that the first alignment treatment substrate be the common electrode substrate and the second alignment treatment substrate be the TFT substrate.

A molecular direction of the ferroelectric liquid crystal used in this embodiment is changed by about 2 times a tilt angle of the ferroelectric liquid crystal parallel to the surface of the first alignment treatment substrate when a negative voltage is applied to the first electrode layer.

Suppose that the case where the voltage of the pixel electrode is relatively high is defined as the case plus-polarized voltage is applied, whereas the case where the voltage of the pixel electrode is relatively low is defined as the case where minus-polarized voltage is applied. The definition like this allows the following explanations as to this embodiment. Specifically, when the first alignment treatment substrate is the common electrode substrate and the second alignment treatment substrate is the TFT substrate, the molecular direction of the ferroelectric liquid crystal is changed by about 2 times a tilt angle of the ferroelectric liquid crystal parallel to the surface of the first alignment treatment substrate when the voltage of the pixel electrode is relatively higher than that of the common electrode, that is, in the case where plus-polarized voltage is applied. When the first alignment treatment substrate is the TFT substrate and the second alignment treatment substrate is the common electrode substrate, the molecular direction of the ferroelectric liquid crystal is changed by about 2 times a tilt angle of the ferroelectric liquid crystal parallel to the surface of the first alignment treatment substrate when the voltage of the pixel electrode is relatively lower than that of the common electrode, that is, in the case where minus-polarized voltage is applied.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The present invention will be explained in more detail by way of examples and comparative examples.

Example 1

Production of a Second Alignment Treatment Substrate

A glass substrate having formed thereon an ITO electrode was thoroughly washed and was spin-coated with a transparent resist (trade name: NN780, manufactured by JSR Corporation), which was then dried under reduced pressure and pre-baked at 90° C. for 3 minutes. Then, the glass substrate was exposed to ultra violet light at a dose of 100 mJ/cm$^2$ through a mask. Then, the substrate was developed by an inorganic alkali solution and then, post-baked at 230° C. for 30 minutes. By the above process, a columnar spacer 1.5 μm in height was formed.

Next, a 2 wt % cyclopentanone solution of a photo-dimerization type material (trade name: ROP103, manufactured by Rolic Technologies) was applied to the surface of the glass substrate on which the above columnar spacer was formed, by spin coating at a rotation of 1500 rpm for 15 seconds and then dried at 130° C. for 15 minutes. Then, the glass substrate was irradiated with linearly polarized ultra violet rays at a dose of about 100 mJ/cm$^2$ to carry out alignment treatment. Moreover, a 2 wt % cyclopentanone solution of a reactive liquid crystal (trade name: ROF-5101, manufactured by Rolic Technologies) containing an acrylate monomer was applied to and laminated on the above coating layer by spin coating at a rotation of 1500 rpm for 15 seconds, dried at 55° C. for 3 minutes and then, irradiated with non-polarized ultra violet rays at 55° C. at a dose of 1000 mJ/cm$^2$ (Production of a First Alignment Treatment Substrate)

A glass substrate having formed thereon an ITO electrode was thoroughly washed and placed in a vapor deposition apparatus. Then, silicon oxide was vapor-deposited on a glass substrate, from an oblique direction at an incident angle of 500 to 550 with the normal line axis of the surface of the substrate to form an oblique vapor deposition-alignment layer. The layer thickness of this oblique vapor deposition-alignment layer was 50 nm.

(Production of a Liquid Crystal Display)

A seal agent was applied to the first alignment treatment substrate by using a seal dispenser. Then, the first alignment treatment substrate and the second alignment treatment substrate were disposed to face each other in such a manner that the direction of vapor deposition was substantially perpendicular to the direction of the linearly polarized ultra violet rays to be applied and then thermally applied to each other under pressure to produce an empty liquid crystal cell.

Next, using a ferroelectric liquid crystal (trade name: R2301, manufactured by AZ Electronic Materials), it was attached to the upper part of the injecting opening and an oven was used to inject the liquid crystal at a temperature higher than the N-phase-isotropic phase transition temperature by 10° C. to 20° C. and then, the temperature was returned to room temperature slowly.

In the obtained liquid crystal display, the existent ratio of double domains in the panel was about 82:18. When a negative voltage was applied to the electrode layer of the fixed liquid crystal layer side, the ferroelectric liquid crystals varied in molecular direction about 2 times a tilt angle parallel to the substrate surface in about 82% of the area of all the crystal layer.

Comparative Example 1

Production of a First Alignment Treatment Substrate

A glass substrate having formed thereon an ITO electrode was thoroughly washed and was spin-coated with a transparent resist (trade name: NN780, manufactured by JSR Corporation), which was then dried under reduced pressure and pre-baked at 90° C. for 3 minutes. Then, the glass substrate was exposed to ultra violet light at a dose of 100 mJ/cm$^2$ through a mask. Then, the substrate was developed by an inorganic alkali solution and then, post-baked at 230° C. for 30 minutes. By the above process, a columnar spacer 1.5 μm in height was formed.

Next, a 2 wt % cyclopentanone solution of a photo-dimerization type material (trade name: ROP103, manufactured by Rolic Technologies) was applied to the surface of the glass substrate on which the above columnar spacer was formed, by spin coating at a rotation of 1500 rpm for 15 seconds and then dried at 130° C. for 5 minutes. Then, the glass substrate was irradiated with linearly polarized ultra violet rays at a dose of about 100 mJ/cm$^2$ to carry out alignment treatment. Moreover, a 2 wt % cyclopentanone solution of a reactive liquid crystal (trade name: ROF-5101, manufactured by Rolic Technologies) containing an acrylate monomer was applied to and laminated on the above coating layer by spin coating at a rotation of 1500 rpm for 15 seconds, dried at 55° C. for 3 minutes and then, irradiated with non-polarized ultra violet rays at 55° C. at a dose of 1000 mJ/cm$^2$.
(Production of a Second Alignment Treatment Substrate)

A glass substrate having formed thereon an ITO electrode was thoroughly washed and a 2 wt % cyclopentanone solution of a photo-dimerization type material (trade name: ROP103, manufactured by Rolic Technologies) was applied to the surface of the glass substrate by spin coating at a rotation of 1500 rpm for 15 seconds and then dried at 130° C. for 15 minutes. Then, the glass substrate was irradiated with linearly polarized ultra violet rays at a dose of about 100 mJ/cm$^2$ to carry out alignment treatment. Moreover, a 2 wt % cyclopentanone solution of a reactive liquid crystal (trade name: ROF-5101, manufactured by Rolic Technologies) containing an acrylate monomer was applied to and laminated on the above coating layer by spin coating at a rotation of 1500 rpm for 15 seconds, dried at 55° C. for 3 minutes and then, irradiated with non-polarized ultra violet rays at 55° C. at a dose of 1000 mJ/cm$^2$.
(Production of a Liquid Crystal Display)

A seal agent was applied to one of the alignment treatment substrate by using a seal dispenser. Then, the first alignment treatment substrate and the second alignment treatment substrate were disposed to face each other in such a manner that the direction of respective alignment treatments becomes parallel to each other and then thermally applied to each other under pressure to produce an empty liquid crystal cell.

Next, using a ferroelectric liquid crystal (trade name: R2301, manufactured by AZ Electronic Materials), it was attached to the upper part of the injecting opening and an oven was used to inject the liquid crystal at a temperature higher than the N-phase-isotropic phase transition temperature by 10° C. to 20° C. and then, the temperature was returned to room temperature slowly.

When voltage was applied to the liquid crystal display such that one electrode layer functions as the negative electrode, a part of the ferroelectric liquid crystals did not change in the molecular direction though a part of the ferroelectric liquid crystals changed in molecular direction about 2 times a tilt angle of the ferroelectric liquid crystal. About 50% of all ferroelectric liquid crystals changed in molecular direction about 2 times a tilt angle.

Example 2

Production of a Second Alignment Treatment Substrate

A glass substrate having formed thereon an ITO electrode was thoroughly washed and was spin-coated with a transparent resist (trade name: NN780, manufactured by JSR Corporation), which was then dried under reduced pressure and pre-baked at 90° C. for 3 minutes. Then, the glass substrate was exposed to ultra violet light at a dose of 100 mJ/cm$^2$ through a mask. Then, the substrate was developed by an inorganic alkali solution and, post-baked at 230° C. for 30 minutes. By the above process, a columnar spacer 1.5 μm in height was formed.

Next, a NMP solution of a photo-dimerization type material (trade name: LIA01, manufactured by DIC) was applied to the surface of the glass substrate on which the above columnar spacer was formed, by spin coating at a rotation of 1500 rpm for 15 seconds and then dried at 100° C. for one minute. Then, the glass substrate was irradiated with linearly polarized ultra violet rays at a dose of about 1000 mJ/cm$^2$ to carry out alignment treatment.
(Production of a First Alignment Treatment Substrate)

A glass substrate having formed thereon an ITO electrode was thoroughly washed and placed in a vapor deposition apparatus. Then, silicon oxide was vapor-deposited on a glass substrate, from an oblique direction at an incident angle of 50° to 55° with the normal line axis of the surface of the substrate to form an oblique vapor deposition-alignment layer. The layer thickness of this oblique vapor deposition-alignment layer was 50 nm.
(Production of a Liquid Crystal Display)

A seal agent was applied to the first alignment treatment substrate by using a seal dispenser. Then, the first alignment treatment substrate and the second alignment treatment substrate were disposed to face each other in such a manner that the direction of vapor deposition was substantially parallel to the direction of the linearly polarized ultra violet rays to be applied and then thermally applied to each other under pressure to produce an empty liquid crystal cell.

Next, using a ferroelectric liquid crystal (trade name: R2301, manufactured by AZ Electronic Materials), it was attached to the upper part of the injecting opening and an oven was used to inject the liquid crystal at a temperature higher than the N-phase-isotropic phase transition temperature by 10° C. to 20° C. and then, the temperature was returned to room temperature slowly.

In the obtained liquid crystal display, the existent ratio of double domains in the panel was about 87:13. When a negative voltage was applied to the electrode layer of the first alignment treatment substrate side, the ferroelectric liquid crystals changed in molecular direction about 2 times a tilt angle in about 87% of the area of all the crystal layer.

Comparative Example 2

Production of a Second Alignment Treatment Substrate

A glass substrate having formed thereon an ITO electrode was thoroughly washed and was spin-coated with a transparent resist (trade name: NN780, manufactured by JSR Corporation), which was then dried under reduced pressure and pre-baked at 90° C. for 3 minutes. Then, the glass substrate was exposed to ultra violet light at a dose of 100 mJ/cm$^2$ through a mask. Then, the substrate was developed by an inorganic alkali solution and then, post-baked at 230° C. for 30 minutes. By the above process, a columnar spacer 1.5 μm in height was formed.

Next, a NMP solution of a photo-dimerization type material (trade name: LIA01, manufactured by DIC) was applied to the surface of the glass substrate on which the above columnar spacer was formed, by spin coating at a rotation of 1500 rpm for 15 seconds and then dried at 100° C. for one minute. Then, the glass substrate was irradiated with linearly polarized ultra violet rays at a dose of about 1000 mJ/cm$^2$ to carry out alignment treatment.

(Production of a First Alignment Treatment Substrate)

A glass substrate having formed thereon an ITO electrode was thoroughly washed and was spin-coated with a NMP solution of a photo-dimerization type material (trade name: LIA01, manufactured by DIC), by spin coating at a rotation of 1500 rpm for 15 seconds and then dried at 100° C. for one minute. Then, the glass substrate was irradiated with linearly polarized ultra violet rays at a dose of about 1000 mJ/cm$^2$ to carry out alignment treatment.

(Production of a Liquid Crystal Display)

A seal agent was applied to the first alignment treatment substrate by using a seal dispenser. Then, the first alignment treatment substrate and the second alignment treatment substrate were disposed to face each other in such a manner that the direction of the respective linearly polarized ultra violet rays to be applied becomes substantially parallel to each other and then thermally applied to each other to produce an empty liquid crystal cell.

Next, using a ferroelectric liquid crystal (trade name: R2301, manufactured by AZ Electronic Materials), it was attached to the upper part of the injecting opening and an oven was used to inject the liquid crystal at a temperature higher than the N-phase-isotropic phase transition temperature by 10° C. to 20° C. and then, the temperature was returned to room temperature slowly.

When voltage was applied to the liquid crystal display such that one electrode layer functions as the negative electrode, a part of the ferroelectric liquid crystals did not change in the molecular direction though a part of the ferroelectric liquid crystals changed in molecular direction about 2 times a tilt angle of the ferroelectric liquid crystal. About 50% of all ferroelectric liquid crystals changed in molecular direction about 2 times a tilt angle.

The invention claimed is:

1. A liquid crystal display comprising:
    a first alignment treatment substrate having a first substrate, a first electrode layer formed on the first substrate, and an oblique vapor deposition-alignment layer formed on the first electrode layer;
    a second alignment treatment substrate having a second substrate, a second electrode layer formed on the second substrate, an alignment layer for reactive liquid crystal formed on the second electrode layer, and a fixed liquid crystal layer which is formed on the alignment layer for reactive liquid crystal and obtained by fixing a reactive liquid crystal; and
    a ferroelectric liquid crystal held between the oblique vapor deposition-alignment layer of the first alignment treatment substrate and the fixed liquid crystal layer of the second alignment treatment substrate;
    in which the first alignment treatment substrate and the second alignment treatment substrate are provided such that the oblique vapor deposition-alignment layer and the fixed liquid crystal layer face each other,
    wherein the ferroelectric liquid crystal exhibits mono-stability, and further wherein a molecular direction of the ferroelectric liquid crystal is changed by about 2 times a tilt angle of the ferroelectric liquid crystal parallel to a surface of the first alignment treatment substrate when a negative voltage is applied to the second electrode layer.

2. The liquid crystal display according to claim 1, wherein the alignment layer for reactive liquid crystal is a photo alignment layer.

3. The liquid crystal display according to claim 1, wherein the alignment layer for reactive liquid crystal is an oblique vapor deposition layer.

4. The liquid crystal display according to claim 1, wherein the first alignment treatment substrate is a TFT substrate having a thin film transistor (TFT) formed on the first substrate, and the second alignment treatment substrate is a common electrode substrate in which the second electrode layer is a common electrode.

5. The liquid crystal display according to claim 1, wherein the liquid crystal display is driven by an active matrix system using the thin film transistor.

6. The liquid crystal display according to claim 1, wherein the liquid crystal display is displayed by a field sequential color system.

7. A liquid crystal display comprising:
    a first alignment treatment substrate having a first substrate, a first electrode layer formed on the first substrate, and an oblique vapor deposition-alignment layer formed on the first electrode layer;
    a second alignment treatment substrate having a second substrate, a second electrode layer formed on the second substrate, and a photo alignment layer which is formed on the second electrode layer and using a photo-isomerization type material which imparts anisotropy to an alignment layer by generating a photo-isomerization reaction; and
    a ferroelectric liquid crystal held between the oblique vapor deposition-alignment layer of the first alignment treatment substrate and the photo alignment layer of the second alignment treatment substrate;
    in which the first alignment treatment substrate and the second alignment treatment substrate are provided such that the oblique vapor deposition-alignment layer and the photo alignment layer face each other,
    wherein the ferroelectric liquid crystal exhibits mono-stability, and further wherein a molecular direction of the ferroelectric liquid crystal is changed by about 2 times a tilt angle of the ferroelectric liquid crystal parallel to a surface of the first alignment treatment substrate when a negative voltage is applied to the first electrode layer.

8. The liquid crystal display according to claim 7, wherein the first alignment treatment substrate is a common electrode substrate in which the first electrode layer is a common electrode, and the second alignment treatment substrate is a TFT substrate having a thin film transistor (TFT) formed on the second substrate.

9. The liquid crystal display according to claim 7, wherein the liquid crystal display is driven by an active matrix system using a thin film transistor.

10. The liquid crystal display according to claim 7, wherein the liquid crystal display is displayed by a field sequential color system.

* * * * *